US009541742B2

(12) United States Patent
Lee

(10) Patent No.: US 9,541,742 B2
(45) Date of Patent: Jan. 10, 2017

(54) WIDE-ANGLE LENS SYSTEM AND IMAGING APPARATUS EMPLOYING THE SAME

(71) Applicant: SAMSUNG ELECTRONICS CO., LTD., Suwon-si, Gyeonggi-do (KR)

(72) Inventor: Yong-jae Lee, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 14/076,535

(22) Filed: Nov. 11, 2013

(65) Prior Publication Data
US 2014/0313395 A1 Oct. 23, 2014

(30) Foreign Application Priority Data
Apr. 19, 2013 (KR) .................. 10-2013-0043812

(51) Int. Cl.
*G02B 13/04* (2006.01)
*G02B 13/06* (2006.01)
*G02B 9/64* (2006.01)

(52) U.S. Cl.
CPC ................ *G02B 13/04* (2013.01); *G02B 9/64* (2013.01); *G02B 13/06* (2013.01)

(58) Field of Classification Search
CPC ......... G02B 15/22; G02B 15/24; G02B 15/26; G02B 15/28; G02B 13/04; G02B 15/167; G02B 15/163; G02B 13/06
USPC ............... 359/682, 684, 784, 749, 651, 753
See application file for complete search history.

(56) References Cited

U.S. PATENT DOCUMENTS

| | | | |
|---|---|---|---|
| 4,054,371 A * | 10/1977 | Yasukuni .............. | G02B 15/22 359/683 |
| 6,545,824 B2 | 4/2003 | Sensui | |
| 7,583,441 B2 * | 9/2009 | Taki ...................... | G02B 7/08 359/554 |
| 8,717,686 B2 | 5/2014 | Yamamoto et al. | |
| 2003/0197948 A1 * | 10/2003 | Eguchi ................ | G02B 15/177 359/680 |
| 2006/0291078 A1 * | 12/2006 | Mitani .................. | G02B 7/102 359/819 |
| 2012/0069441 A1 * | 3/2012 | Fujimoto ............ | G02B 15/177 359/557 |
| 2012/0069456 A1 * | 3/2012 | Suzuki ................ | G02B 13/0045 359/716 |
| 2012/0212842 A1 * | 8/2012 | Hosoi .................. | G02B 9/12 359/784 |
| 2013/0141629 A1 * | 6/2013 | Yoshinaga ........... | G02B 7/08 348/345 |

(Continued)

FOREIGN PATENT DOCUMENTS

JP 2001-228391 A 8/2001
JP 2012-058682 A 3/2012
(Continued)

*Primary Examiner* — Zachary Wilkes
(74) *Attorney, Agent, or Firm* — Drinker Biddle & Reath LLP

(57) ABSTRACT

A wide-angle lens system includes, in an order from an object side toward an image surface side: a first lens group having positive or negative refractive power; a second lens group having positive refractive power; and a third lens group having negative refractive power. When an object position changes from an infinite distance to a nearest distance, the first and third lens groups are fixed, and the second lens group moves along an optical axis to perform focusing.

17 Claims, 35 Drawing Sheets

(56) References Cited

U.S. PATENT DOCUMENTS

2013/0271851 A1* 10/2013 Souma .................. G02B 13/24
359/708

FOREIGN PATENT DOCUMENTS

| JP | 2012-063676 A | 3/2012 |
| JP | 2012-113034 A | 6/2012 |

* cited by examiner

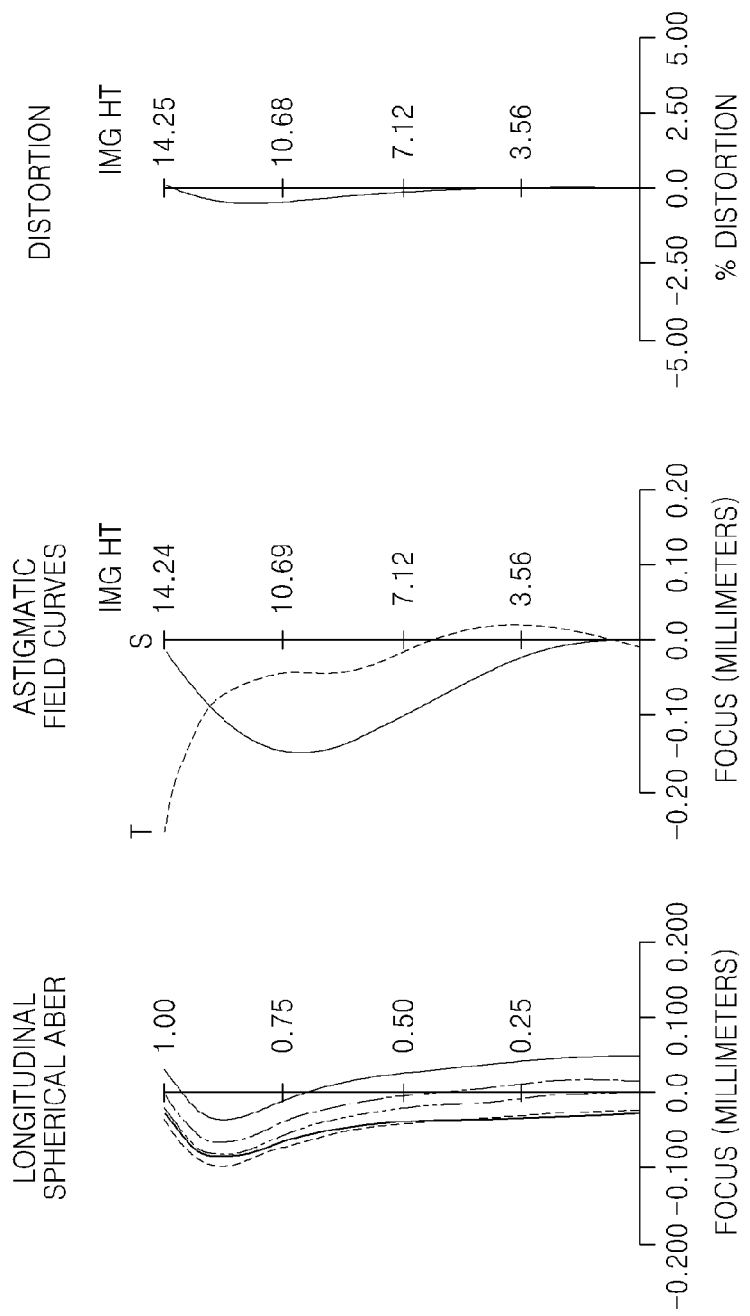

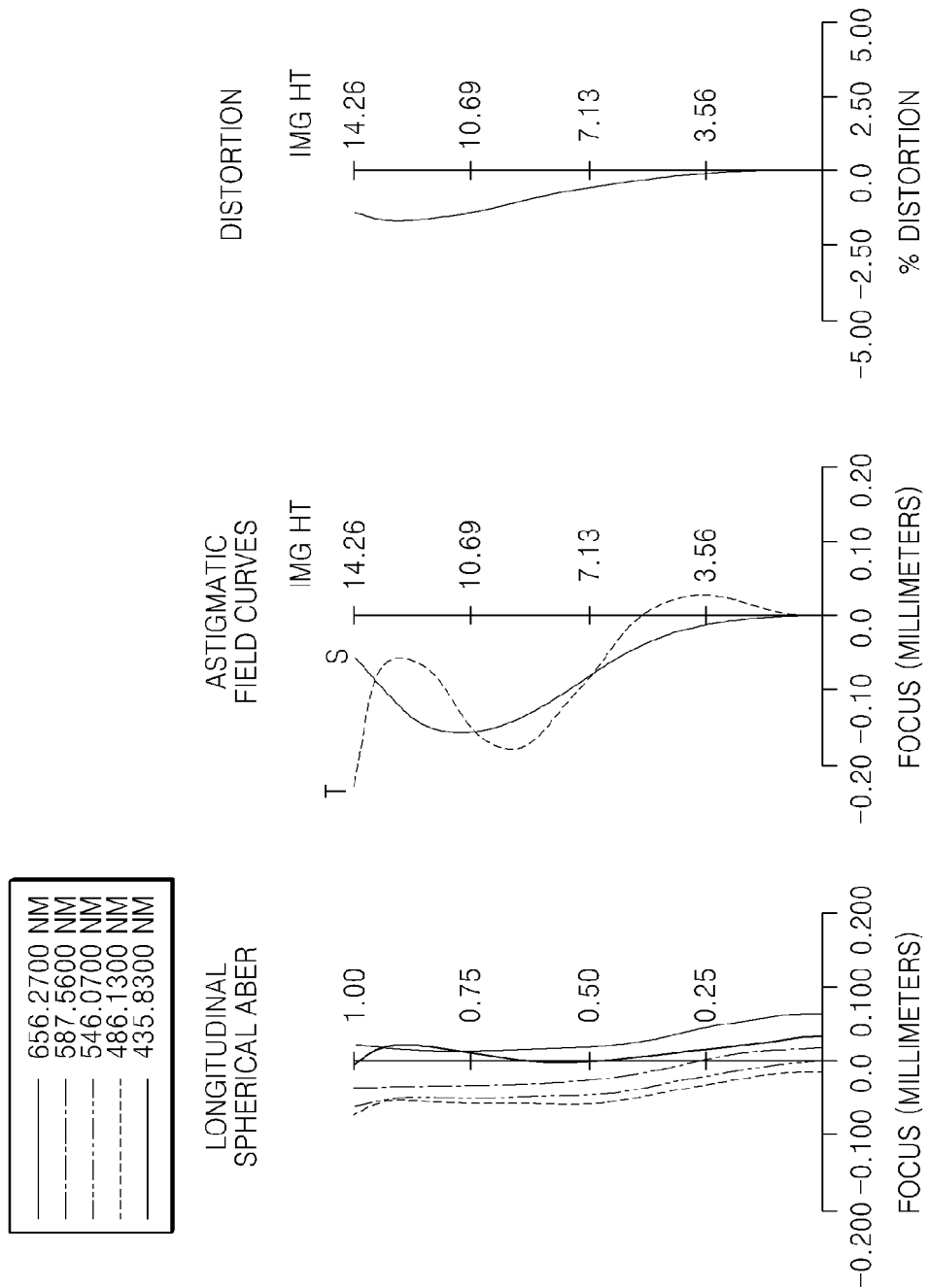

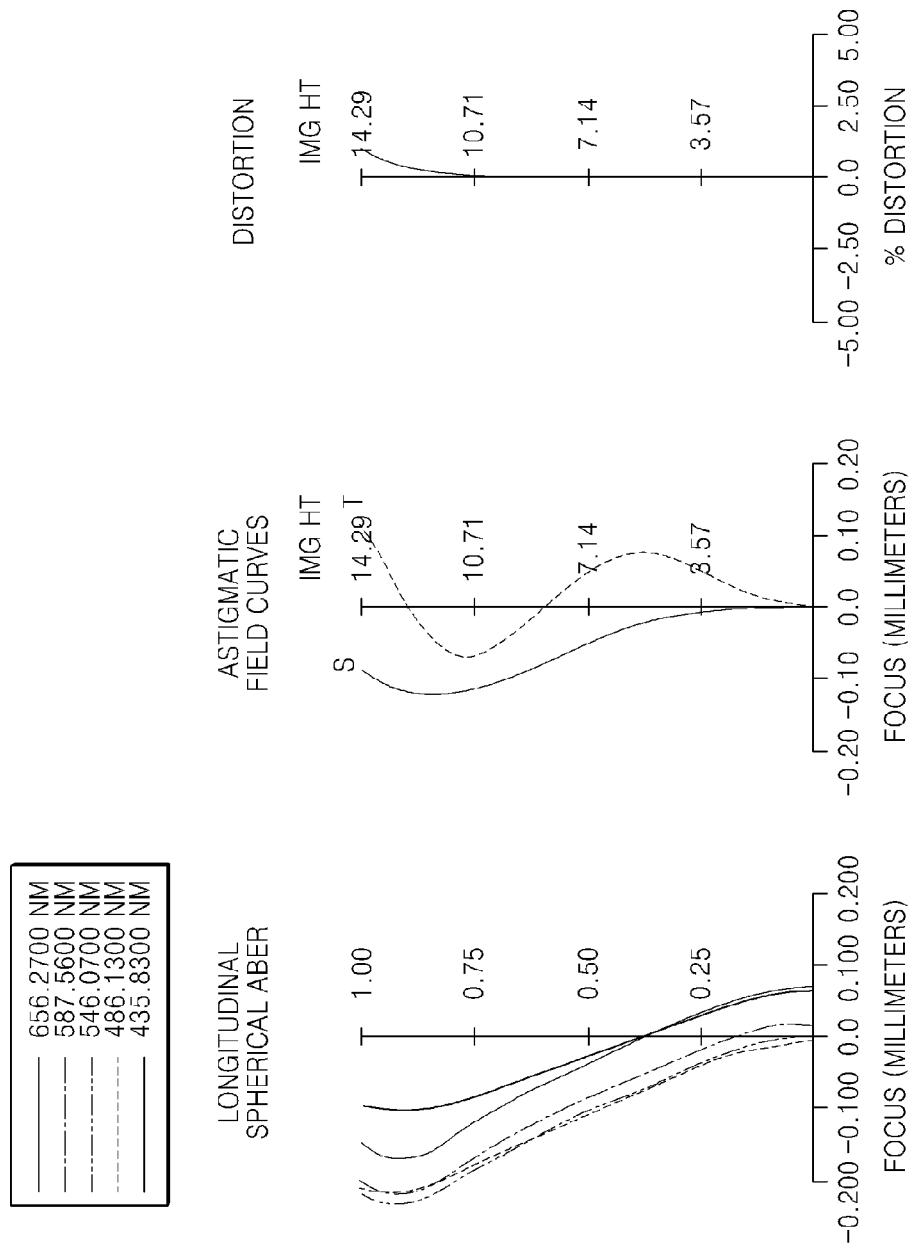

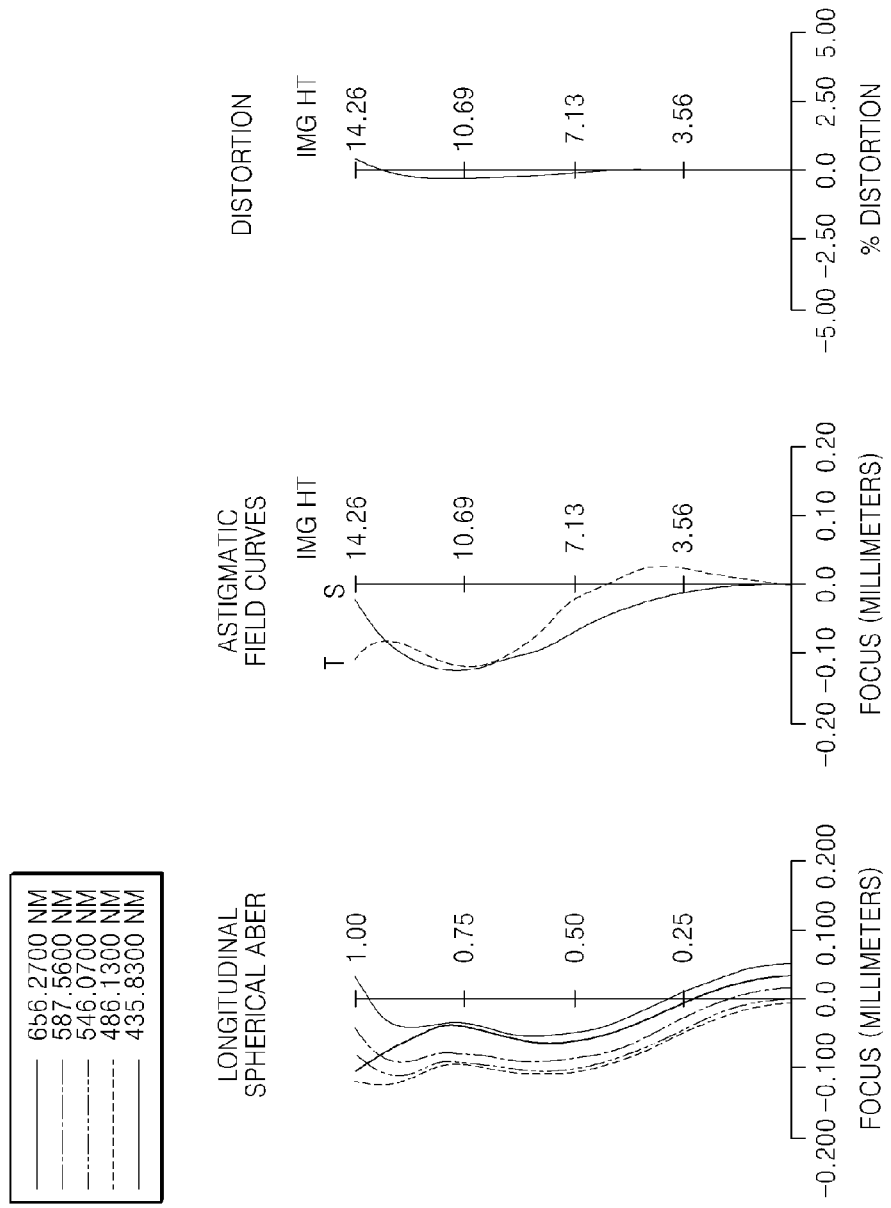

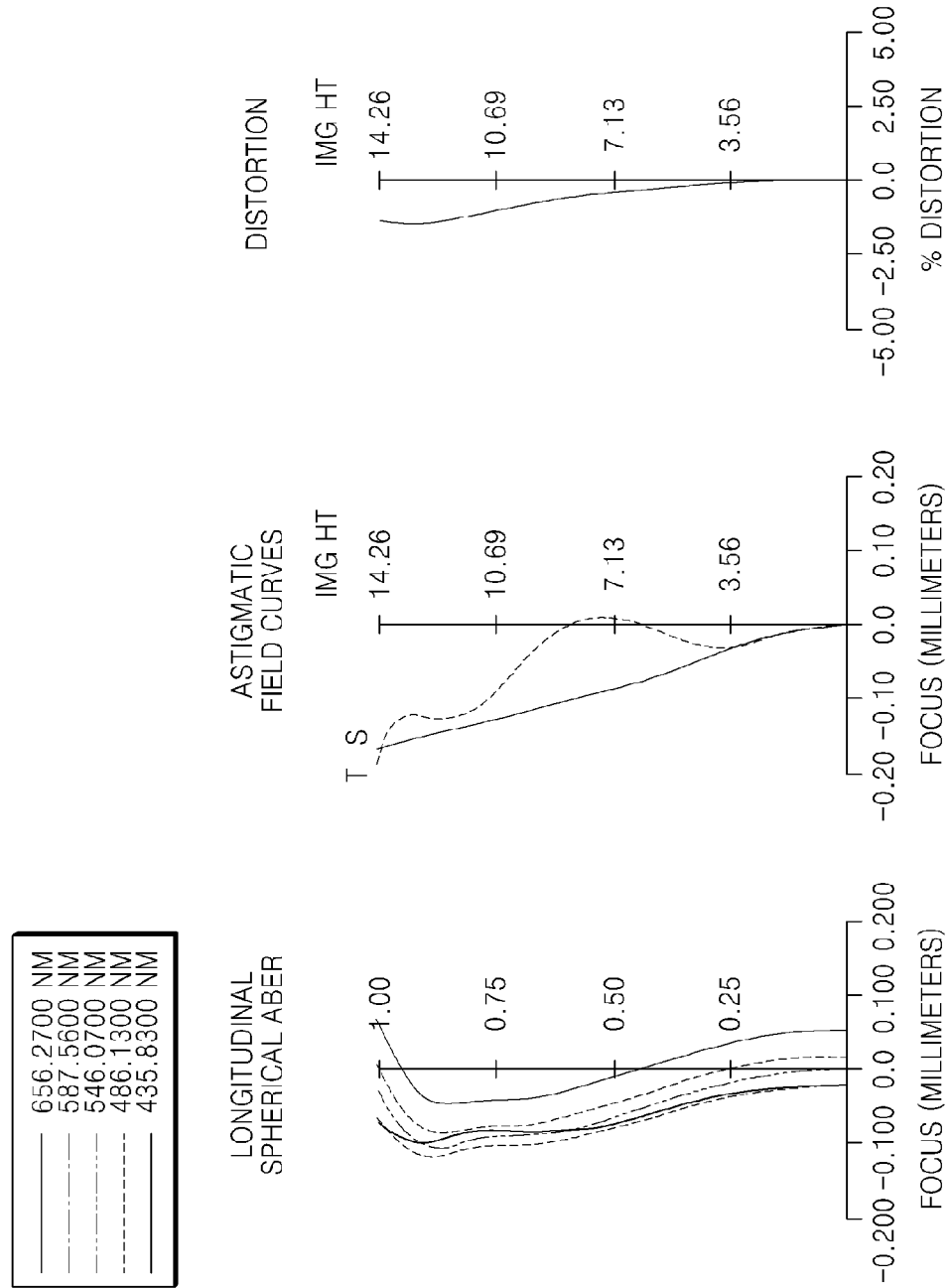

WIDE-ANGLE LENS SYSTEM AND IMAGING APPARATUS EMPLOYING THE SAME

CROSS-REFERENCE TO RELATED PATENT APPLICATION

This application claims the priority benefit of Korean Patent Application No. 10-2013-0043812, filed on Apr. 19, 2013, in the Korean Intellectual Property Office, the disclosure of which is incorporated herein in its entirety by reference.

BACKGROUND

1. Field

Various embodiments of the invention relate to a photographing lens used in an electronic still camera or a digital video camera, and more particularly, to a bright wide-angle lens having a wide viewing angle by using an inner focus method.

2. Related Art

Recently, optical image-forming devices, such as digital cameras or digital camcorders, using a solid-state image pickup device, such as a charge coupled device (CCD) or a complementary metal-oxide semiconductor (CMOS) image sensor, have been rapidly developed and have become widespread. Accordingly, high performance photographing lens having a small and lightweight structure is required.

In the field of optical systems using the solid-state image pickup device, the optical systems need to achieve not only high resolution but also high magnification, all the while being small and lightweight. Also, because the technical expertise of consumers of cameras is continuously increasing, a lens design method that focuses on certain functions of a wide-angle lens, a telephoto lens, and a zoom lens, while satisfying miniaturization, high performance, and auto-focusing is continuously being researched.

A wide-angle lens generally uses a two-group structure called a retro-focus lens. In the two-group structure, a first group has negative refractive power and a second group has positive refractive power, and a back focal length is similar to or longer than a focal length. Here, a total length of the two-group structure is increased as a distance between the first and second groups is increased. But the back focal length is required to be equal to or larger than a predetermined distance, even as a latter group portion is moved or as the latter group portion and a former group portion are simultaneously or separately moved to perform focusing. Thus, the decrease in the total length of the two-group structure is limited. Moreover, in a bright lens, a plurality of lenses are moved during focusing for aberration correction, and thus a focusing response is not great. Also, a lens group performing the focusing is typically heavy thereby increases the load on a driving unit, and thus the focusing may not be quickly performed.

SUMMARY

One or more embodiments provide a bright wide-angle lens system that performs focusing using an inner focus method.

According to an embodiment, a wide-angle lens system includes, in an order from an object side toward an image surface side: a first lens group having negative refractive power; a second lens group having positive refractive power; and a third lens group having negative refractive power, where when an object position changes from an infinite distance to a nearest distance, the first and third lens groups are fixed, and the second lens group moves along an optical axis to perform focusing.

The wide-angle lens system may satisfy the following condition: $1.5<OAL/Y<3.5$, where OAL denotes a distance between a first surface of the wide-angle lens system from the object side and an image surface, and Y denotes a paraxial image height.

The wide-angle lens system may satisfy the following condition: $0.6<f2/f<1.5$, where f2 and f respectively denotes a focal length of the second lens group and a total focal length of the wide-angle lens system based on an infinite object position.

The first lens group or the second lens group may include an aspherical lens having at least one aspherical surface.

The wide-angle lens system may perform hand shake compensation by moving a part of the first lens group or the entire first lens group in a direction crossing the optical axis.

An aperture stop may be disposed between the first and second lens groups, where the aperture stop may be fixed during focusing.

The wide-angle lens system may satisfy the following condition: $0.35<(OL2+OL3)/OL23<0.8$, where OL23 denotes a distance between a first surface of the second lens group from the object side and a surface of the third lens group closest to the image surface side, OL2 denotes a distance between a first surface of the second lens group from the object side and a last surface of the second lens group from the object side, and OL3 denotes a distance between a first surface of the third lens group from the object side and a last surface of the third lens group from the object side.

The wide-angle lens system may satisfy the following condition: $3.5<Fno*OAL/Y<6.5$, where Fno denotes a F-number during a full-opening, OAL denotes a distance between a first surface of the wide-angle lens system from the object side and an image surface, and Y denotes a paraxial image height.

The wide-angle lens system may satisfy the following condition: $0.15<BF/Y<1.0$, wherein BF denotes a distance between a surface of the wide-angle lens system closest to the image surface side and an image surface, and Y denotes a paraxial image height.

A total length of the wide-angle lens system may be reduced as the first, second, and third lens groups move to the image surface side when the wide-angle lens system is not in use.

According to another embodiment, a wide-angle lens system includes, in an order from an object side toward an image surface side: a first lens group having positive refractive power; a second lens group having positive refractive power; and a third lens group having negative refractive power. When an object position changes from an infinite distance to a nearest distance, the first and third lens groups are fixed and the second lens group moves along an optical axis to perform focusing. The wide-angle lens system satisfies the following condition: $3.5<Fno*OAL/Y<6.5$, where Fno denotes a F-number during a full-opening, OAL denotes a distance between a first surface of the wide-angle lens system from the object side and an image surface, and Y denotes a paraxial image height.

The wide-angle lens system may satisfy the following condition: $0.15<BF/Y<1.0$, where BF denotes a distance between a surface of the wide-angle lens system closest to the image surface side and the image surface, and Y denotes a paraxial image height.

The wide-angle lens system may satisfy the following condition: 1.5<OAL/Y<3.5, where OAL denotes a distance between a first surface of the wide-angle lens system from the object side and the image surface, and Y denotes a paraxial image height.

The wide-angle lens system may satisfy the following condition: 0.6<f2/f<1.5, wherein f2 and f respectively denote a focal length of the second lens group and a total focal length of the wide-angle lens system based on an infinite object position.

The first lens group or the second lens group may include an aspherical lens having at least one aspherical surface.

The wide-angle lens system may perform hand shake compensation by moving a part of the first lens group or the entire first lens group in a direction crossing an optical axis.

An aperture stop may be disposed between the first and second lens groups, where the aperture stop may be fixed during focusing.

The wide-angle lens system may satisfy the following condition: 0.35<(OL2+OL3)/OL23<0.8, where OL23 denotes a distance between a first surface of the second lens group from the object side and a surface of the third lens group closest to the image surface side, OL2 denotes a distance between a first surface of the second lens group from the object side and a last surface of the second lens group from the object side, and OL3 denotes a distance between a first surface of the third lens group from the object side and a last surface of the third lens group from the object side.

A total length of the wide-angle lens system may be reduced as the first, second, and third lens groups move to the image surface side when the wide-angle lens system is not in use.

According to another embodiment, an imaging apparatus includes: the wide-angle lens system, and an image pickup device that converts an optical image formed by the wide-angle lens system to an electric signal.

BRIEF DESCRIPTION OF THE DRAWINGS

The above and other features and advantages will become more apparent by describing in detail exemplary embodiments thereof with reference to the attached drawings in which:

FIGS. 2A through 2C are diagrams illustrating spherical aberrations, astigmatic field curvatures, and distortion aberrations of the wide-angle lens system of FIG. 1 in the three object positions;

FIGS. 5A through 5C are diagrams illustrating spherical aberrations, astigmatic field curvatures, and distortion aberrations of the wide-angle lens system of FIG. 4 in the three object positions;

FIGS. 8A through 8C are diagrams illustrating spherical aberrations, astigmatic field curvatures, and distortion aberrations of the wide-angle lens system of FIG. 7 in the three object positions;

FIGS. 11A through 11C are diagrams illustrating spherical aberrations, astigmatic field curvatures, and distortion aberrations of the wide-angle lens system of FIG. 10 in the three object positions;

DETAILED DESCRIPTION

Figure 1:
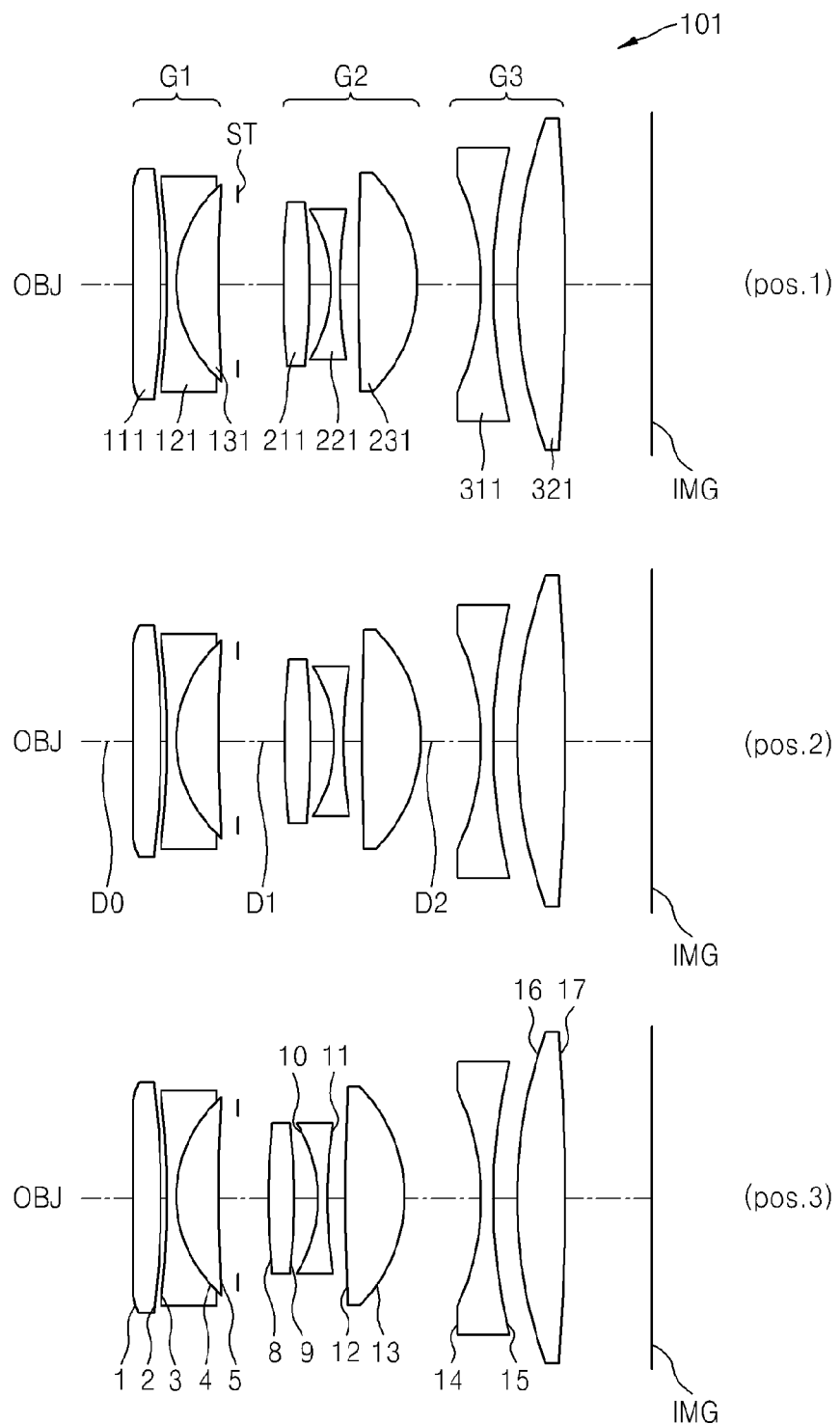
FIG. 1 illustrates optical arrangements in a wide-angle lens system in three object positions, according to an embodiment.

Hereinafter, various embodiments will be described more fully with reference to the accompanying drawings, in which exemplary embodiments are shown. In the drawings, like reference numerals denote like elements, and the sizes of elements may be exaggerated for clarity.

FIGS. 1, 4, 7, 10, and 13 are diagrams illustrating optical arrangements in wide-angle lens systems 101 through 105, respectively, in three object positions pos1, pos2, and pos3.

The three object positions pos1, pos2, and pos3 respectively denote cases when the object is disposed at infinite, intermediate, and nearest distances, which will be described in detail later with reference to lens data.

The wide-angle lens systems 101 through 105 according to various embodiments each include, in an order from an object OBJ side toward an image surface IMG side, a first lens group G1 having positive or negative refractive power, a second lens group G2 having positive refractive power and performing focusing by moving along an optical axis, and a third lens group G3 having negative refractive power. An aperture stop ST may be further disposed between the first and second lens groups G1 and G2. A filter or cover glass (not shown) may be disposed at the image surface IMG side of the third lens group G3.

In the wide-angle lens systems 101 through 105 according to the embodiments, the first and third lens groups G1 and G3 are fixed and only the second lens group G2 moves so that aberration fluctuation is reduced during auto-focusing and the auto-focusing is quickly performed.

The wide-angle lens systems 101 through 105 may satisfy condition 1 below.

$$1.5 < OAL/Y < 3.5 \qquad (1)$$

Here, OAL denotes a distance between a first surface of the wide-angle lens systems 101 through 105 from the object OBJ side and to the image surface IMG, and Y denotes a paraxial image height.

Condition 1 is suggested to configure a system in which an image-forming ability is guaranteed through a relationship between a size of the overall optical system and an image height.

In a range lower than the lower limit of the condition 1, the system may not be configured since the size of the optical system is small as compared to the image height. In a range higher than the upper limit of the condition 1, the system may be inefficient since the size of the optical system is large as compared to the image height.

Also, the wide-angle lens systems 101 through 105 may satisfy condition 2 below.

$$0.70 < f2/f < 1.5 \tag{2}$$

Here, f2 denotes a focal length of the second lens group G2 and f denotes a total focal length of the wide-angle lens systems 101 through 105.

Condition 2 defines a ratio of the focal length of the second lens group G2 to the total focal length of the lens system, and is suggested to determine refractive power suitable for aberration correction of the second lens group G2.

In a range lower than the lower limit of the condition 2, the refractive power of the second lens group G2 may be excessive and thus aberration correction of astigmatic field curvature and distortion aberration may be difficult. In a range higher than the upper limit of the condition 2, the overall system is increased in size as the refractive power of the second lens group G2 is decreased, and a movement amount during auto-focusing is increased.

Also, the wide-angle lens systems 101 through 105 may satisfy condition 3 below.

$$0.35 < (OL2+OL3)/OL23 < 0.80 \tag{3}$$

Here, OL23 denotes a distance from a first surface of the second lens group G2 from the object OBJ side and a last surface of the third lens group G3 from the image surface IMG side, OL2 denotes a distance between a surface of the second lens group G2 closest to the object OBJ side and a surface of the second lens group G2 closest to the image surface IMG side, and OL3 denotes a distance between a surface of the third lens group G3 closest to the object OBJ side and a surface of the third lens group G3 closest to the image surface IMG side.

Condition 3 is suggested to maintain a compact structure of the wide-angle lens systems 101 through 105.

In a range higher than the upper limit of the condition 3, a proportion of a sum of the lengths of the second and third lens groups G2 and G3 to the length from a first surface of the second lens group G2 from the object OBJ side and a last surface of the third lens group G3 from the image surface IMG side is increased, and thus a space between the second and third lens groups G2 and G3 during the focusing may not be sufficient and configurations of the second and third lens groups G2 and G3 may not be compact. In a range lower than the lower limit of the condition 3, the configurations of the second and third lens groups G2 and G3 may be compact, but each component forming the second and third lens groups G2 and G3 may be too small and thus a configuration of an optical system may be difficult.

Also, the wide-angle lens systems 101 through 105 may satisfy condition 4 below.

$$3.5 < Fno \times (OAL/Y) < 6.5 \tag{4}$$

Here, Fno denotes an F-number during a full-opening, OAL denotes a distance between a first surface of the wide-angle lens systems 101 through 105 from the object OBJ side and the image surface IMG, and Y denotes a image height paraxial image height.

Condition 4 is suggested so that the wide-angle lens systems 101 through 105 have a compact structure while maintaining brightness performance.

In a range higher than the upper limit of the condition 4, a total optical length and the F-number are increased, and thus the compact structure and the brightness performance may not be obtained. In a range lower than the lower limit of the condition 4, it is difficult to adjust the F-number and the total optical length, and thus optimum performance may not be achieved.

Also, the wide-angle lens systems 101 through 105 may satisfy condition 5 below.

$$0.15 < BF/Y < 1.0 \tag{5}$$

Here, BF denotes a back focal length, i.e., a distance between a surface of the third lens group G3 closest to the image surface IMG and the image surface IMG, and Y denotes a paraxial image height.

Condition 5 defines a relationship between the image height and the back focal length, and is suggested to configure a compact optical system.

In a range higher than the upper limit of the condition 5, the back focal length may be increased and thus it may be difficult to maintain a compact structure of an optical system. In a range lower than the lower limit of the condition 5, the back focal length may be too short as compared to the image height, and thus a slope of an incident light ray may be increased.

The first or second lens group G1 or G2 may include an aspherical lens having at least one aspherical surface. Unlike a spherical lens, the aspherical lens has limitations in terms of processability and materials. The second lens group G2 is an auto-focusing group and an intermediate group, and is suitable for employing an aspherical lens since an entrance height of a light ray is high as compared to a relatively small outer diameter of the aspherical lens. Productivity may be high since performance compensation with respect to an aspherical lens having a small outer diameter is possible as a lens outer diameter is small and an entrance height is high. When the third lens group G3 is to employ an aspherical lens, an aspherical lens having an outer diameter similar to an image height is required, and thus it is difficult for the third lens group G3 to employ an aspherical lens in an optical system that requires a high image height.

The aperture stop ST may be disposed between the first and second lens groups G1 and G2, and may be fixed during focusing. The aperture stop ST is fixed during focusing so that an auto-focusing lens group is lightweight. If the aperture stop ST moves during focusing, the auto-focusing lens group may become heavy.

The first lens group G1 may also be used as a hand shake compensation lens group. Hand shake compensation is a function for preventing a screen from shaking due to minute hand shake or the like when a user performs slow speed photography. In the wide-angle lens systems 101 through 105 according to the embodiments, the first or third lens group G1 or G3 may be used as the hand shake compensation lens group instead of the second lens group G2, which is an auto-focusing group. For example, the hand shake compensation may be performed by moving a part of or the entire first lens group G1 in a direction crossing the optical axis.

When the wide-angle lens systems 101 through 105 are not used, the first through third lens groups G1 through G3 may move towards the image surface IMG side to reduce a total length, thereby increasing portability.

Lens configurations and lens data of the first through third lens groups G1 through G3 will now be described according to the embodiments.

An aspherical surface shown in lens data is defined as follows.

$$x = \frac{c'y^2}{1 + \sqrt{1-(K+1)c'^2h^2}} + Ah^4 + Bh^6 + Ch^8 + Dh^{10}$$

Here, x denotes a distance from a vertex of a lens in an optical axis direction, y denotes a distance in a direction perpendicular to an optical axis, K denotes a conic constant, A, B, C, and D denote aspherical coefficients, and c' denotes an inverse of a radius of curvature (1/R) at the vertex of the lens.

In the lens data, ST denotes an aperture stop, F/# denotes an F-number, and ω denotes a half view angle. Also, R, Th, nd, and vd respectively denote a radius of curvature, a lens thickness or distance between lenses, a refractive index, and an Abbe's number, and * indicated after a surface number denotes that a corresponding surface is aspherical. D0 denotes an object position, and D1 and D2 denote a variable distance according to movement of the second lens group G2 during the focusing. A unit of a distance in the lens data is mm.

First Embodiment

FIG. 1 illustrates optical arrangements in the wide-angle lens system 101 in the three object positions pos1, pos2, and pos3, according to an embodiment. The wide-angle lens system 101 includes the first lens group G1 having positive refractive power, the second lens group G2 having positive refractive power, and the third lens group G3 having negative refractive power. The first lens group G1 includes a first lens 111 having a biconvex shape, a second lens 121 having a biconcave shape, and a third lens 131 having a meniscus shape convex towards the object OBJ side. The second and third lenses 121 and 131 may form a cemented lens. The second lens group G2 includes a fourth lens 211 having a biconvex shape, a fifth lens 221 having a biconcave shape, and a sixth lens 231 having a biconvex shape. The third lens group G3 includes a seventh lens 311 having a biconcave shape and an eighth lens 321 having a biconvex shape.

Lens data of the wide-angle lens system 101 is as follows.

TABLE 1

| Surface | R | Th | nd | vd |
|---|---|---|---|---|
| OBJ | Infinity | D0 | | |
| 1 | 300 | 2.215 | 1.91082 | 35.25 |
| 2 | −53.973 | 0.421 | | |
| 3 | −40.238 | 0.7 | 1.64293 | 31.43 |
| 4 | 11.214 | 3.328 | 1.91082 | 35.25 |

TABLE 1-continued

| Surface | R | Th | nd | vd |
|---|---|---|---|---|
| 5 | 92.779 | 0.529 | | |
| 6 | Infinity | 1.5 | | |
| 7 (ST) | Infinity | D1 | | |
| 8* | 34.848 | 2.267 | 1.85066 | 40.4 |
| 9* | −50.446 | 1.326 | | |
| 10 | −10.884 | 0.75 | 1.71979 | 27.51 |
| 11 | 28.227 | 1.379 | | |
| 12* | 47.254 | 5 | 1.85066 | 40.4 |
| 13* | −12.419 | D2 | | |
| 14 | −24.12 | 0.88 | 1.66768 | 29.95 |
| 15 | 50.764 | 1.934 | | |
| 16 | 36.501 | 4.076 | 1.79742 | 45.78 |
| 17 | −206.653 | 3.147 | | |

TABLE 2

| Surface | K | A | B | C | D |
|---|---|---|---|---|---|
| 8 | 3.759.E−01 | −1.516.E−04 | −4.143.E−07 | −2.915.E−08 | 0.000.E+00 |
| 9 | −3.626.E−01 | −2.494.E−04 | 1.026.E−06 | −6.470.E−08 | 7.291.E−10 |
| 12 | −3.133.E+00 | −9.701.E−05 | 6.753.E−07 | −4.756.E−09 | 1.559.E−11 |
| 13 | −4.369.E−01 | 2.964.E−06 | −4.365.E−07 | 2.513.E−09 | −5.648.E−11 |

TABLE 3

| | Pos1 | Pos2 | Pos3 |
|---|---|---|---|
| Magnification | 0 | −1/40 | −0.12 |
| D0 | infinity | 984.30982 | 203.73065 |
| D1 | 4.03956 | 3.57376 | 2.02005 |
| D2 | 5.26608 | 5.73599 | 7.43339 |
| ω | 29.975 | 30.014 | 29.862 |
| F/# | 1.836 | 1.838 | 1.979 |

Figure 2B:
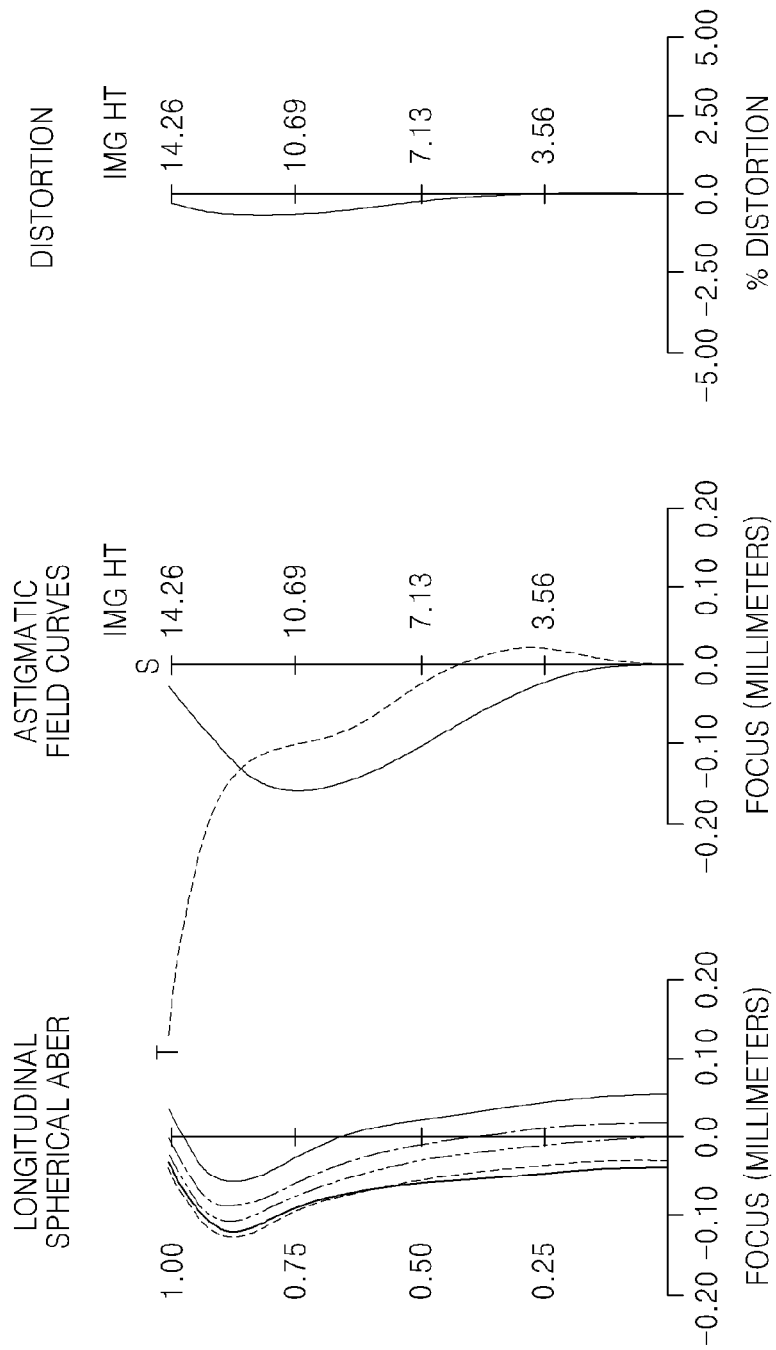
Figure 2C:
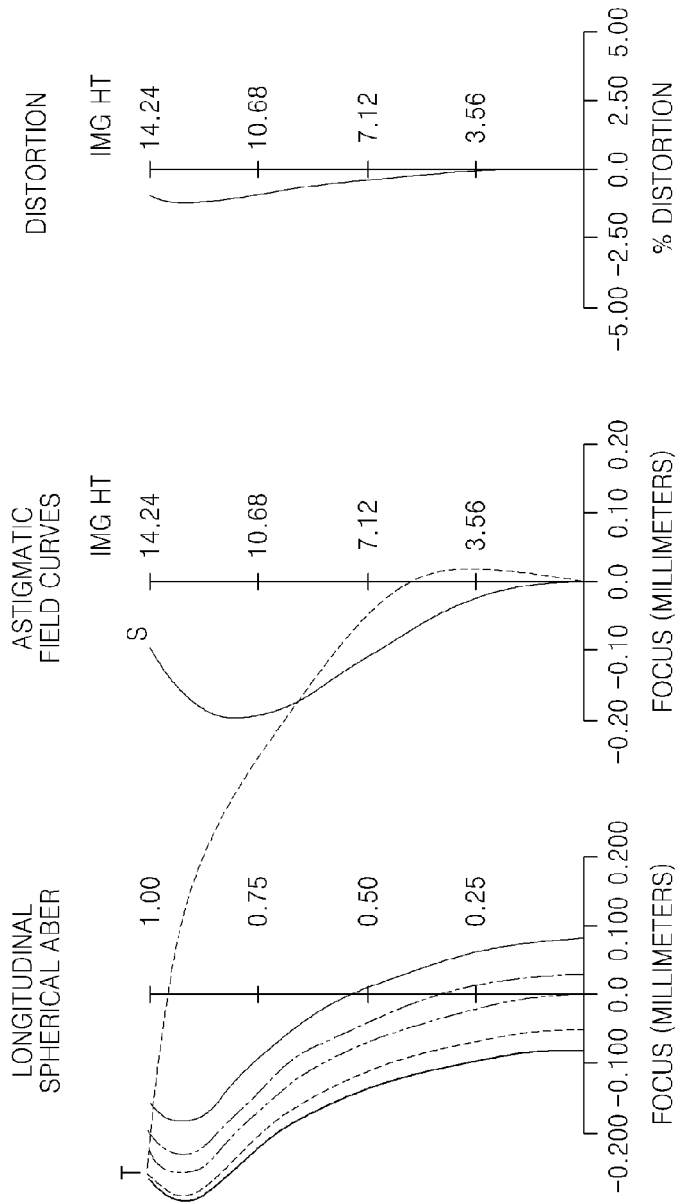

FIGS. 2A through 2C illustrate spherical aberrations, astigmatic field curvatures, and distortion aberrations of the wide-angle lens system 101 of FIG. 1 in the three object positions pos1, pos2, and pos3.

The spherical aberrations are with respect to light rays whose wavelengths are 656.27 nm, 587.56 nm, 546.07 nm, 486.13 nm, and 435.83 nm, the astigmatic field curvatures and distortion aberrations are with respect to a light ray whose wavelength is 546.07 nm. In the astigmatic field curvatures, T and S respectively denote curvatures on a tangential surface and a sagittal surface.

Figure 3A:
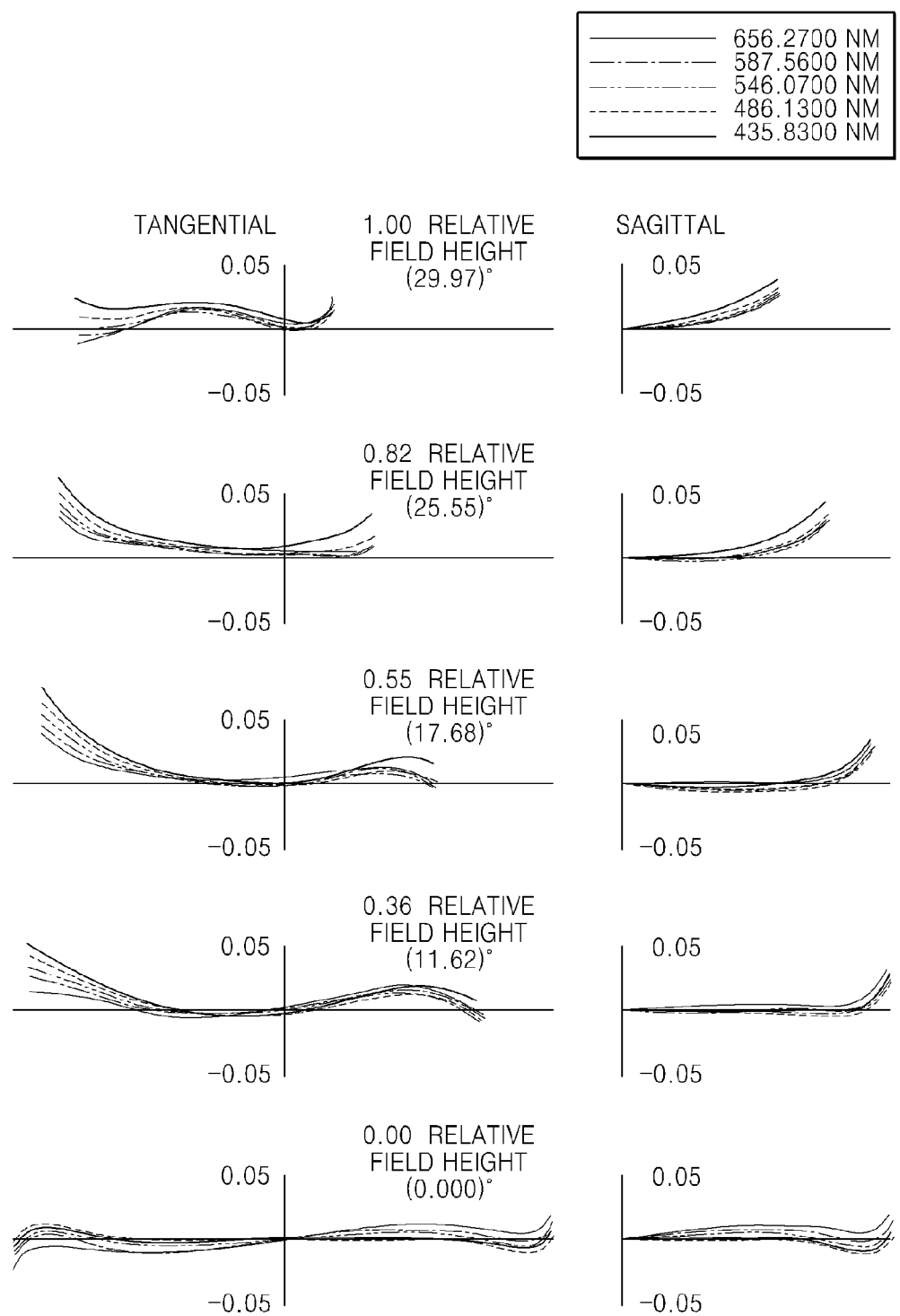
FIGS. 3A through 3C are diagrams illustrating coma aberrations of the wide-angle lens system of FIG. 1 in the three object positions.
Figure 3B:
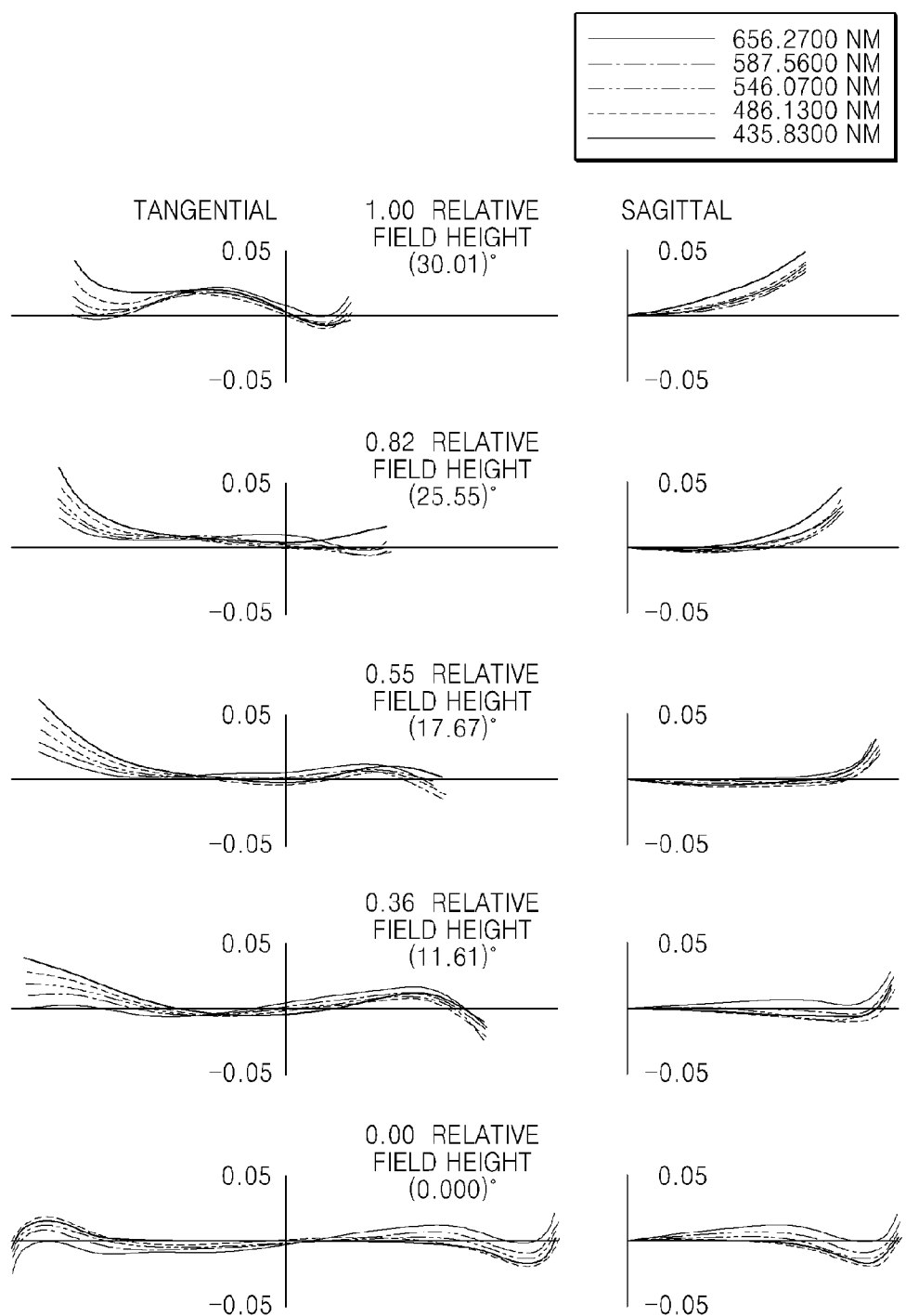
Figure 3C:
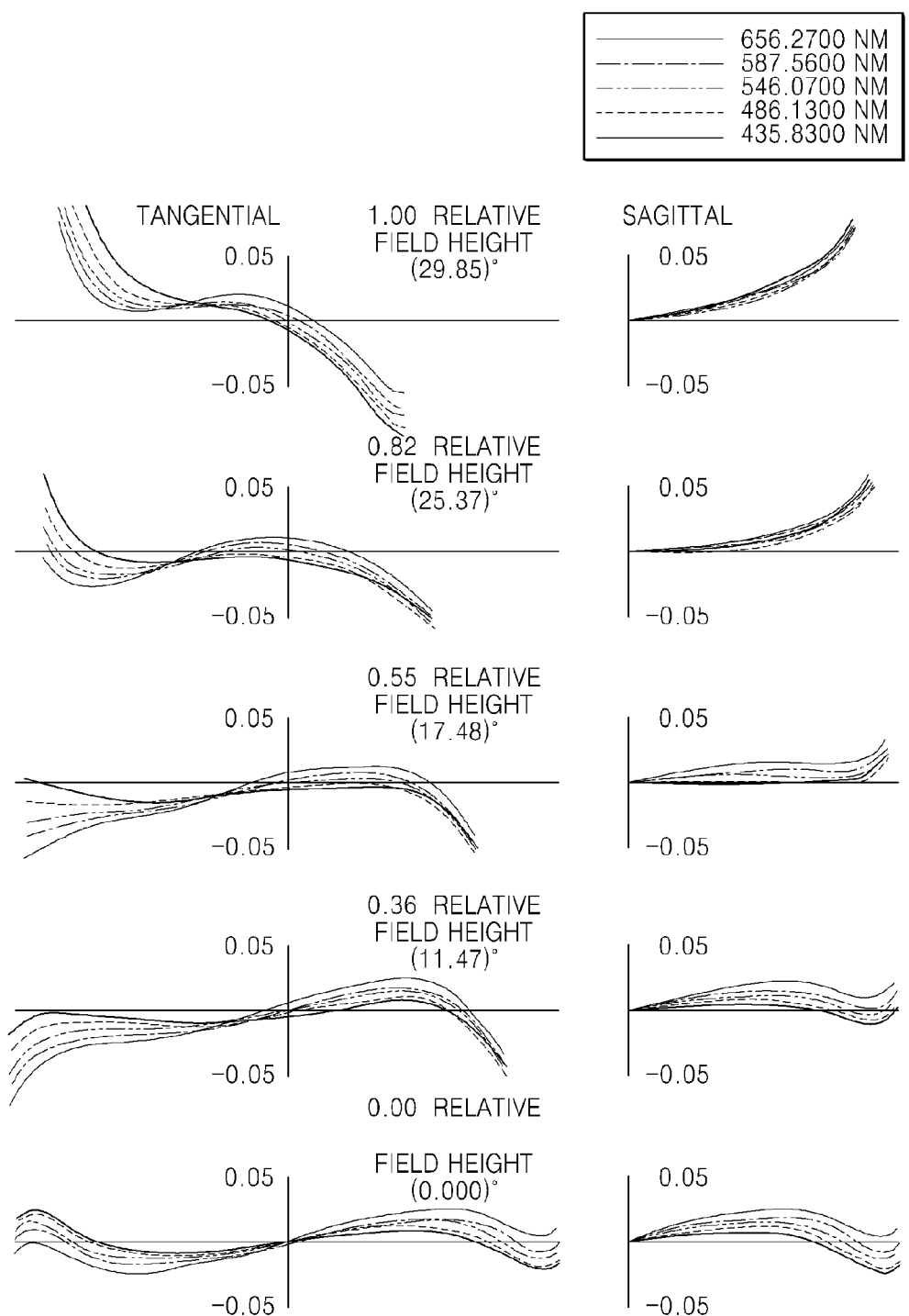

FIGS. 3A through 3C illustrate coma aberrations of the wide-angle lens system 101 of FIG. 1 in the three object positions post, pos2, and pos3.

Second Embodiment

Figure 4:
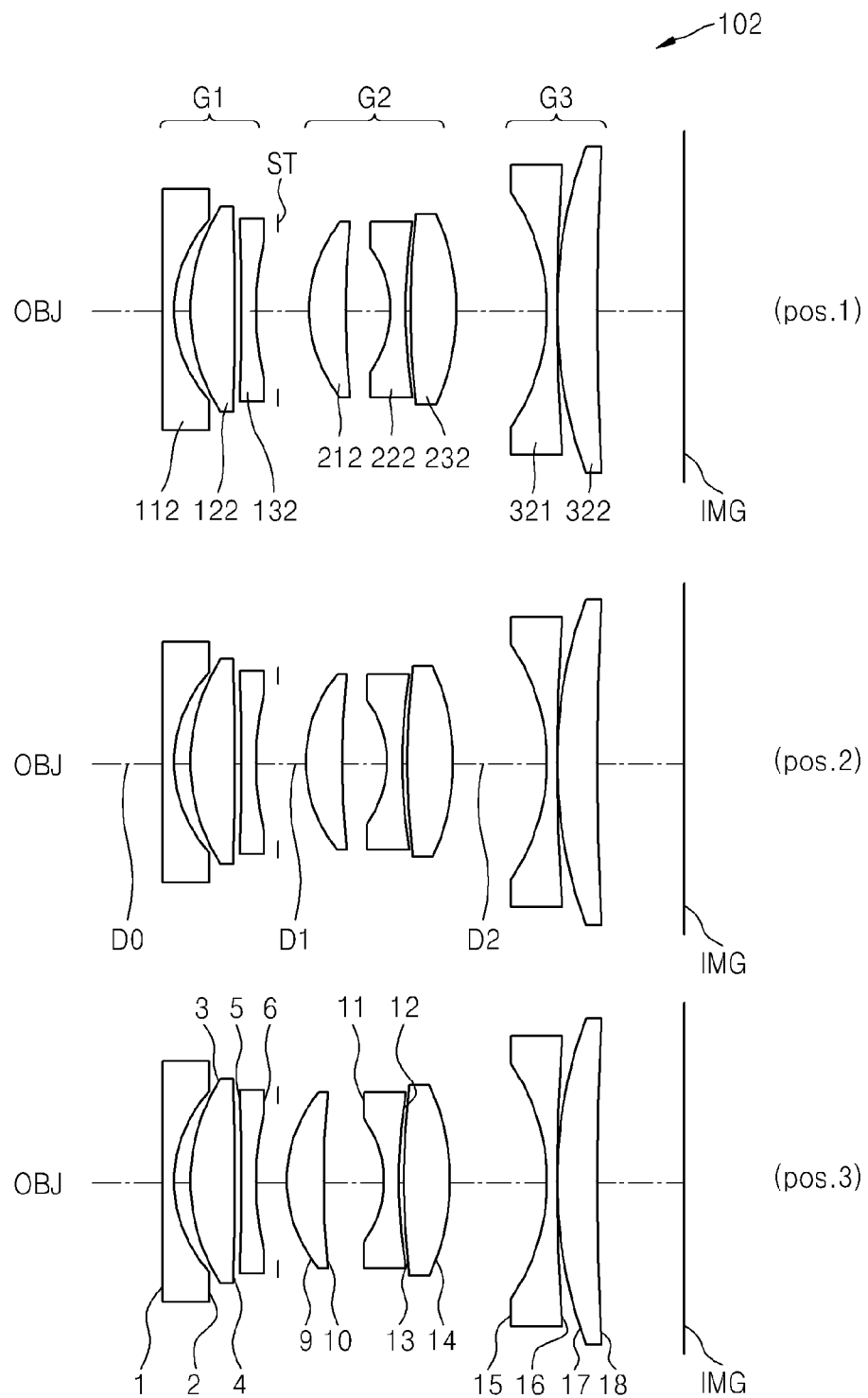
FIG. 4 illustrates optical arrangements in a wide-angle lens system of FIG. 1 in three object positions, according to another embodiment.

FIG. 4 illustrates optical arrangements in the wide-angle lens system 102 in three object positions pos1, pos2, and pos3, according to another embodiment. The wide-angle lens system 102 includes the first lens group G1 having negative refractive power, the second lens group G2 having positive refractive power, and the third lens group G3 having negative refractive power. The first lens group G1 includes a first lens 112, a second lens 122, and a third lens 132. The second lens 122 may have a biconvex shape and the third lens 132 may have a biconcave shape. The second lens group G2 includes a fourth lens 212 having a meniscus shape convex towards the object OBJ side, a fifth lens 222 having a biconcave shape, and a sixth lens 232 having a biconvex shape. The third lens group G3 includes a seventh lens 312 having a biconcave shape and an eighth lens 322 having a meniscus shape convex towards the object OBJ side.

Lens data of the wide-angle lens system 102 is as follows.

TABLE 4

| Surface | R | Th | nd | vd |
|---|---|---|---|---|
| OBJ | Infinity | D0 | | |
| 1 | 300 | 1 | 1.48749 | 70.44 |
| 2 | 12.07 | 0.8 | | |
| 3 | 14.61 | 3.79 | 1.91082 | 35.25 |
| 4 | −179.46 | 0.39 | | |
| 5 | −106.39 | 0.85 | 1.92286 | 20.88 |
| 6 | 31.3 | 2.12 | | |
| 7 | Infinity | 0.25 | | |
| 8 (ST) | Infinity | D1 | | |
| 9* | 13.97 | 3.1 | 1.85066 | 40.43 |
| 10* | 121.99 | 3.48 | | |
| 11 | −10.89 | 1.3 | 1.84666 | 23.78 |
| 12 | 58.49 | 0.15 | | |
| 13* | 39.05 | 3.9 | 1.85066 | 40.43 |
| 14* | −12.78 | D2 | | |
| 15 | −17.91 | 0.85 | 1.48749 | 70.44 |
| 16 | 179.57 | 0.04 | | |
| 17 | 37.37 | 3.3 | 1.91085 | 35.25 |
| 18 | 220.4 | 6.556 | | |

TABLE 5

| K | A | B | C | D | E |
|---|---|---|---|---|---|
| 9 | 1.9855.E+00 | −4.5350.E−05 | 2.3147.E−07 | −9.0042.E−09 | 0.0000.E+00 |
| 10 | 5.0000.E+00 | −9.8425.E−06 | 1.5288.E−06 | −2.8052.E−08 | 2.9026.E−10 |
| 13 | −3.3073.E+00 | −5.2843.E−05 | 6.5667.E−07 | 2.0693.E−08 | −7.2772.E−11 |
| 14 | −2.6206.E+00 | −6.8685.E−05 | 7.5201.E−07 | 6.9097.E−09 | 4.1232.E−10 |

TABLE 6

| Magnification | Pos1<br>0 | Pos2<br>−1/40 | Pos3<br>−0.12 |
|---|---|---|---|
| D0 | infinity | 948.64 | 208.18 |
| D1 | 3.03 | 2.55 | 0.65 |
| D2 | 8.01 | 8.48 | 10.38 |
| ω | 31.68 | 31.1 | 28.78 |
| F/# | 1.86 | 1.89 | 2.04 |

Figure 5B:
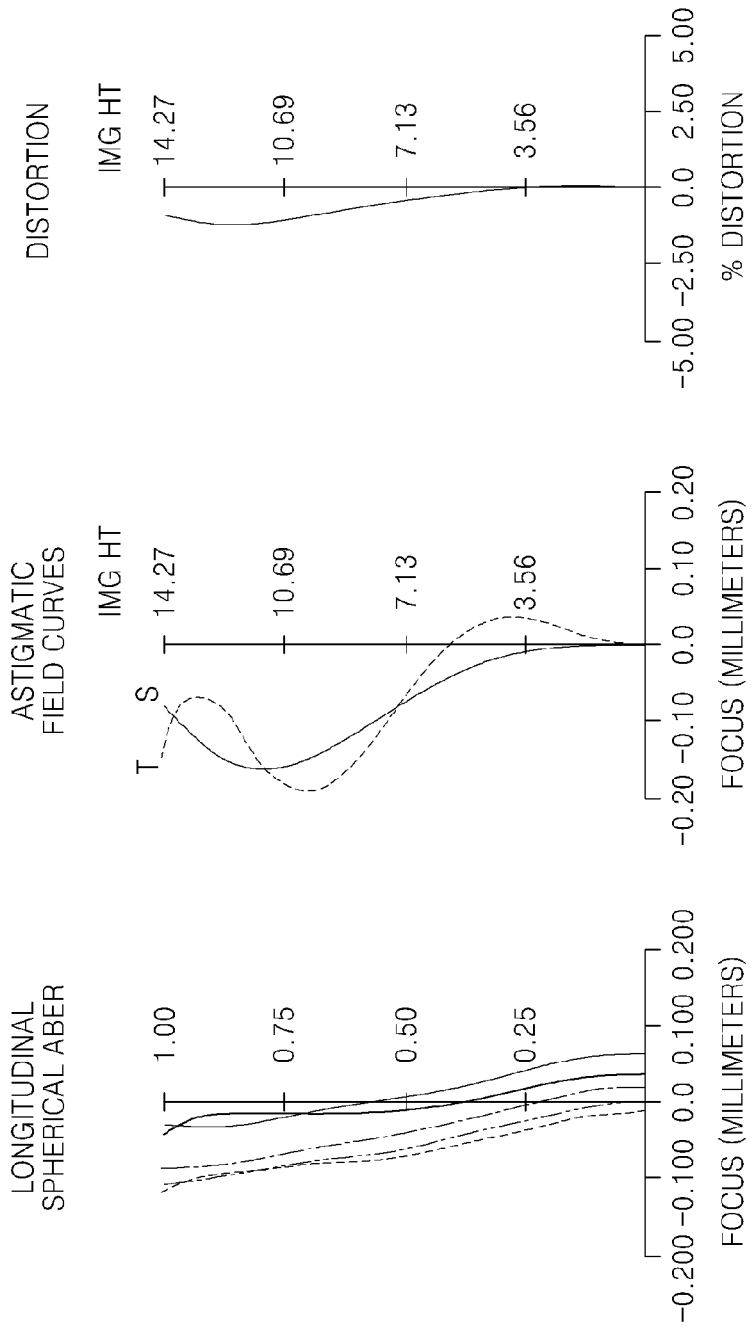

FIGS. 5A through 5C illustrate spherical aberrations, astigmatic field curvatures, and distortion aberrations of the wide-angle lens system 102 of FIG. 4 in the three object positions pos1, pos2, and pos3.

Figure 6A:
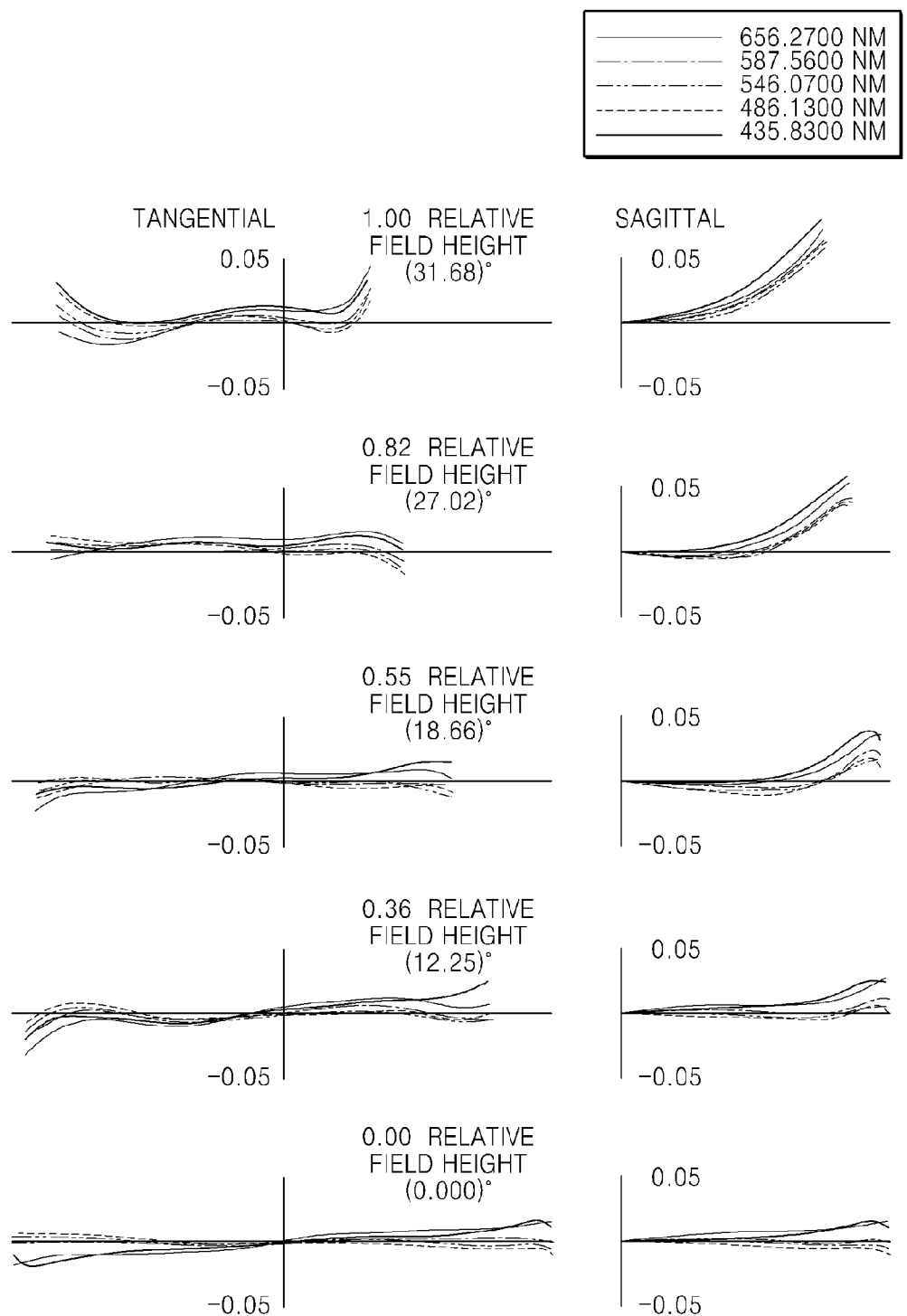
FIGS. 6A through 6C are diagrams illustrating coma aberrations of the wide-angle lens system of FIG. 4 in the three object positions.
Figure 6B:
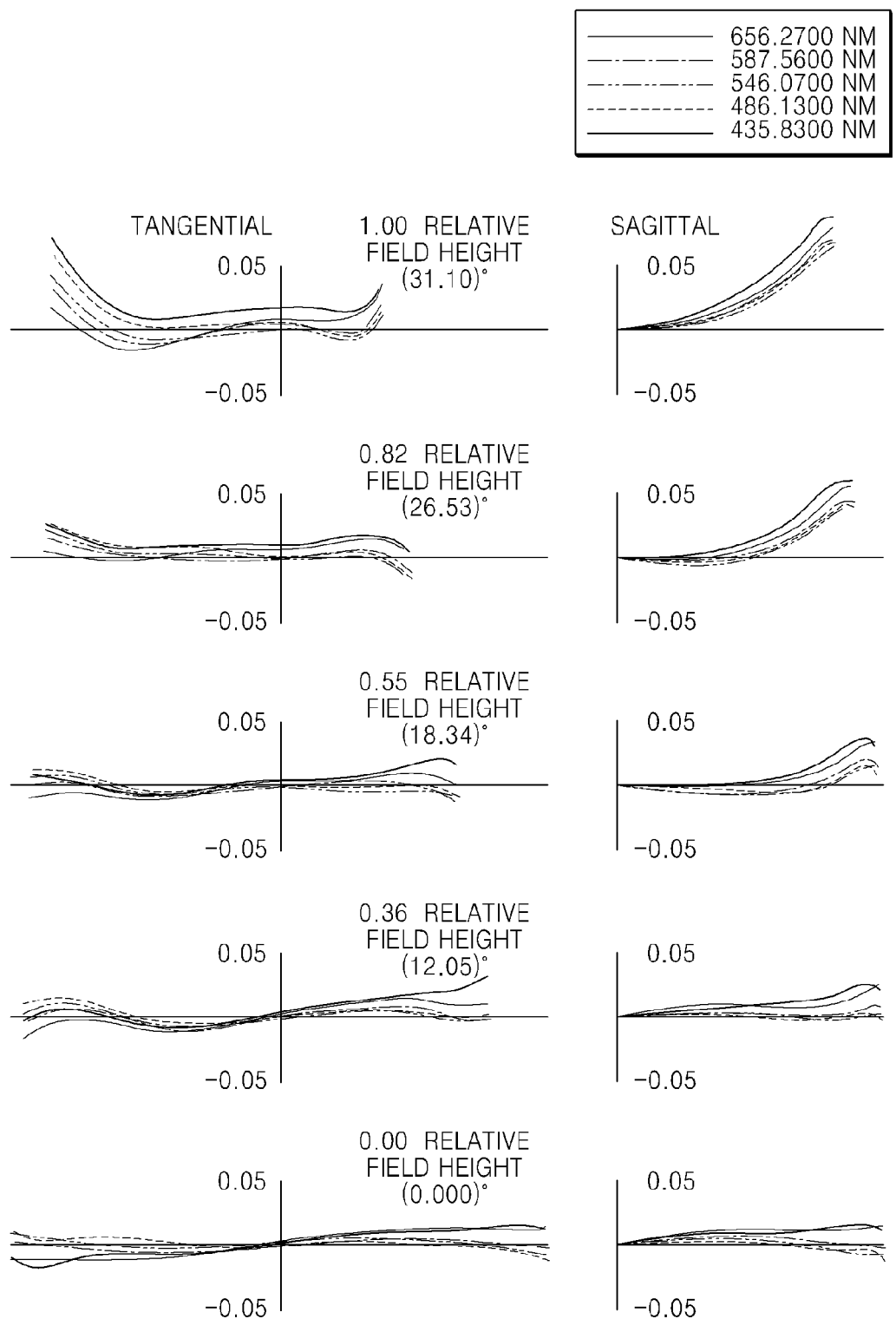
Figure 6C:
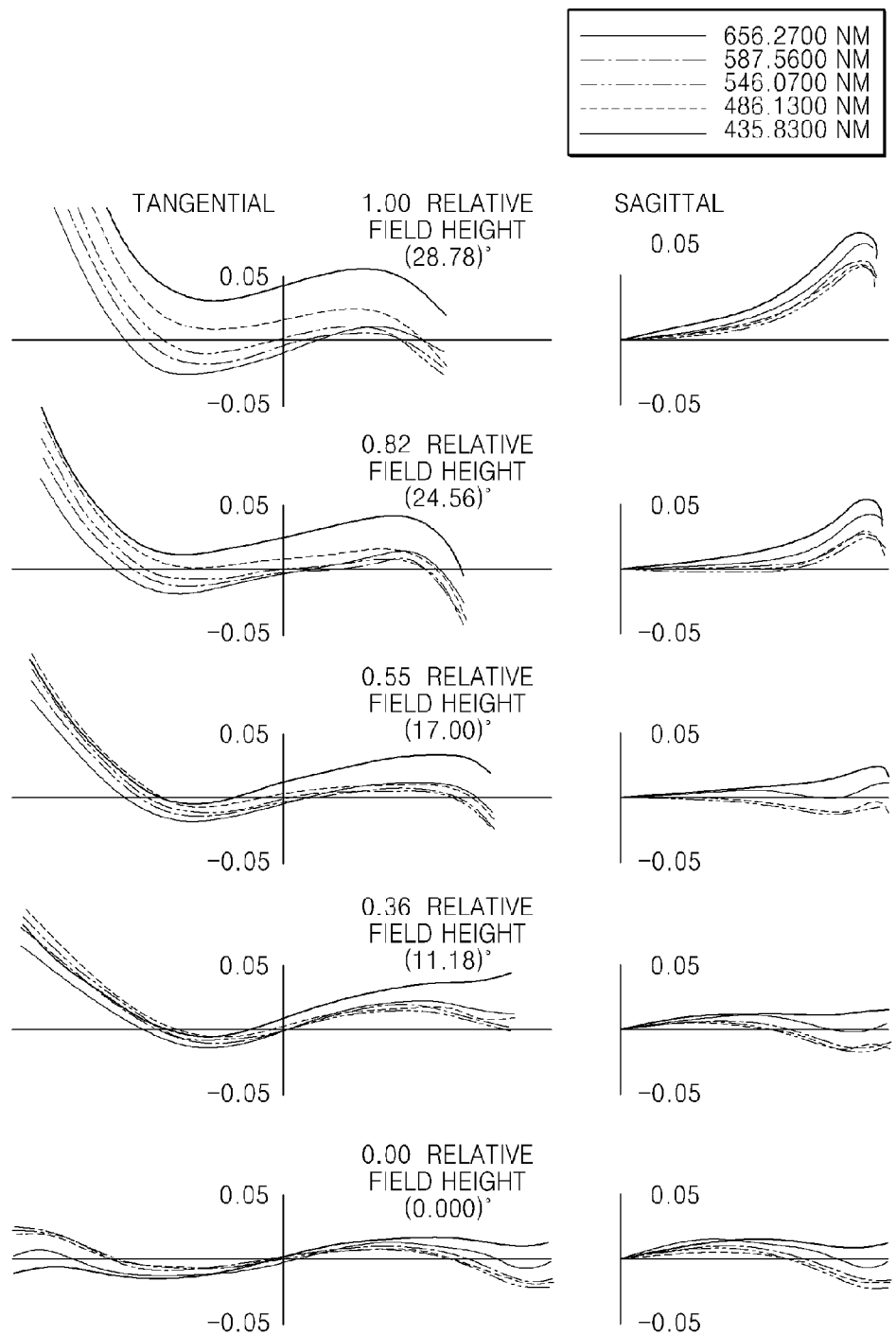

FIGS. 6A through 6C illustrate coma aberrations of the wide-angle lens system 102 of FIG. 4 in the three object positions post, pos2, and pos3.

Third Embodiment

Figure 7:
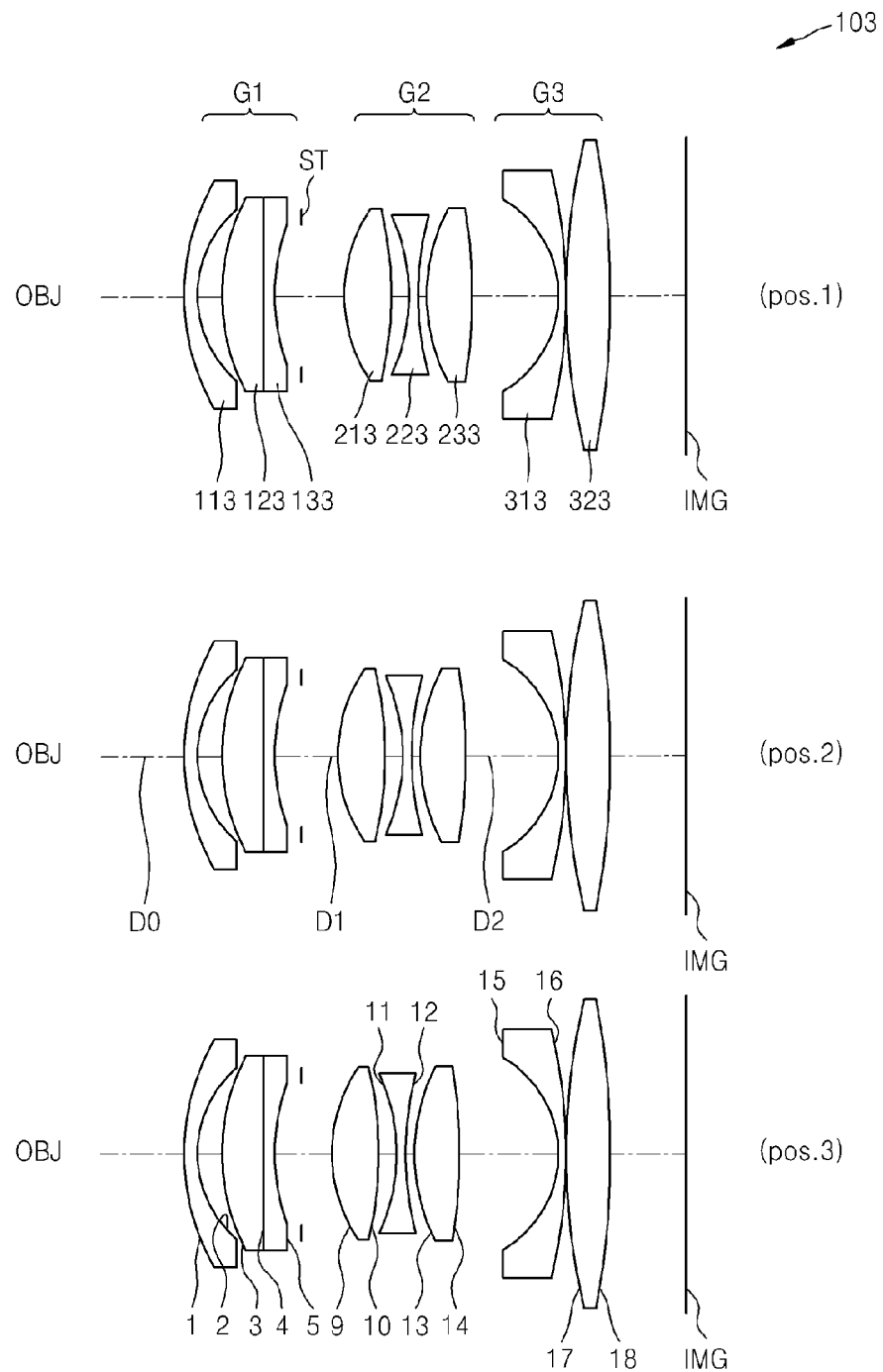
FIG. 7 illustrates optical arrangements in a wide-angle lens system in three object positions, according to another embodiment.

FIG. 7 illustrates optical arrangements in the wide-angle lens system 103 in three object positions pos1, pos2, and pos3, according to another embodiment. The wide-angle lens system 103 includes the first lens group G1 having negative refractive power, the second lens group G2 having positive refractive power, and the third lens group G3 having negative refractive power. The first lens group G1 includes a first lens 113 having a meniscus shape convex towards the object OBJ side, a second lens 123 having a meniscus shape convex towards the object OBJ side, and a third lens 133 having a meniscus shape convex towards the object OBJ side. The second and third lenses 123 and 133 may form a cemented lens. The second lens group G2 includes a fourth lens 213 having a biconvex shape, a fifth lens 223 having a biconcave shape, and a sixth lens 233 having a biconvex shape. The third lens group G3 includes a seventh lens 313 having a meniscus shape convex toward the image surface IMG side, and an eighth lens 323 having a biconvex shape.

Lens data of the wide-angle lens system 103 is as follows.

TABLE 7

| Surface | R | Th | nd | vd |
|---|---|---|---|---|
| OBJ | infinity | D0 | | |
| 1 | 20.81 | 1 | 1.49817 | 80.49 |
| 2 | 10.53 | 1.69 | | |
| 3 | 16.84 | 3.25 | 1.91077 | 35.24 |
| 4 | 149.63 | 1.05 | 1.84666 | 23.78 |
| 5 | 19.8 | 1.05 | | |
| 6 (dummy surface) | infinity | 1.5 | | |
| 7 (dummy surface) | infinity | 0.03 | | |
| 8 (ST) | infinity | D1 | | |
| 9* | 14.98 | 3.81 | 1.85066 | 40.43 |
| 10* | −58.26 | 1.86 | | |
| 11 | −16.58 | 0.72 | 1.84666 | 23.78 |
| 12 | 25.78 | 1.02 | | |
| 13* | 29.16 | 4 | 1.85066 | 40.43 |
| 14* | −19.06 | D2 | | |
| 15 | −9.73 | 0.85 | 1.65009 | 34.2 |
| 16 | −41.57 | 0.04 | | |
| 17 | 59.28 | 3.69 | 1.91082 | 35.25 |
| 18 | −69.72 | 6.191 | | |

TABLE 8

| K | A | B | C | D |
|---|---|---|---|---|
| 9 | 1.3617.E+00 | −1.8533.E−05 | −3.9985.E−07 | 1.6558.E−09 | 0.0000.E+00 |
| 10 | −7.0000.E+00 | −3.1571.E−05 | 2.9602.E−08 | −7.4996.E−09 | 1.1370.E−10 |

TABLE 8-continued

| | K | A | B | C | D |
|---|---|---|---|---|---|
| 13 | 3.0000.E+00 | 3.8890.E−05 | 1.6281.E−07 | 1.4935.E−08 | −3.9853.E−11 |
| 14 | −9.5932.E−01 | 9.7353.E−05 | 7.4096.E−07 | 1.1742.E−08 | 2.0747.E−10 |

TABLE 9

| Magnification | Pos1 0 | Pos2 −1/40 | Pos3 −0.12 |
|---|---|---|---|
| D0 | infinity | 945.45 | 204.15 |
| D1 | 4.75 | 4.4 | 2.93 |
| D2 | 7.45 | 7.79 | 9.27 |
| ω | 31.28 | 30.85 | 28.92 |
| F/# | 1.84 | 1.87 | 1.99 |

Figure 8A:
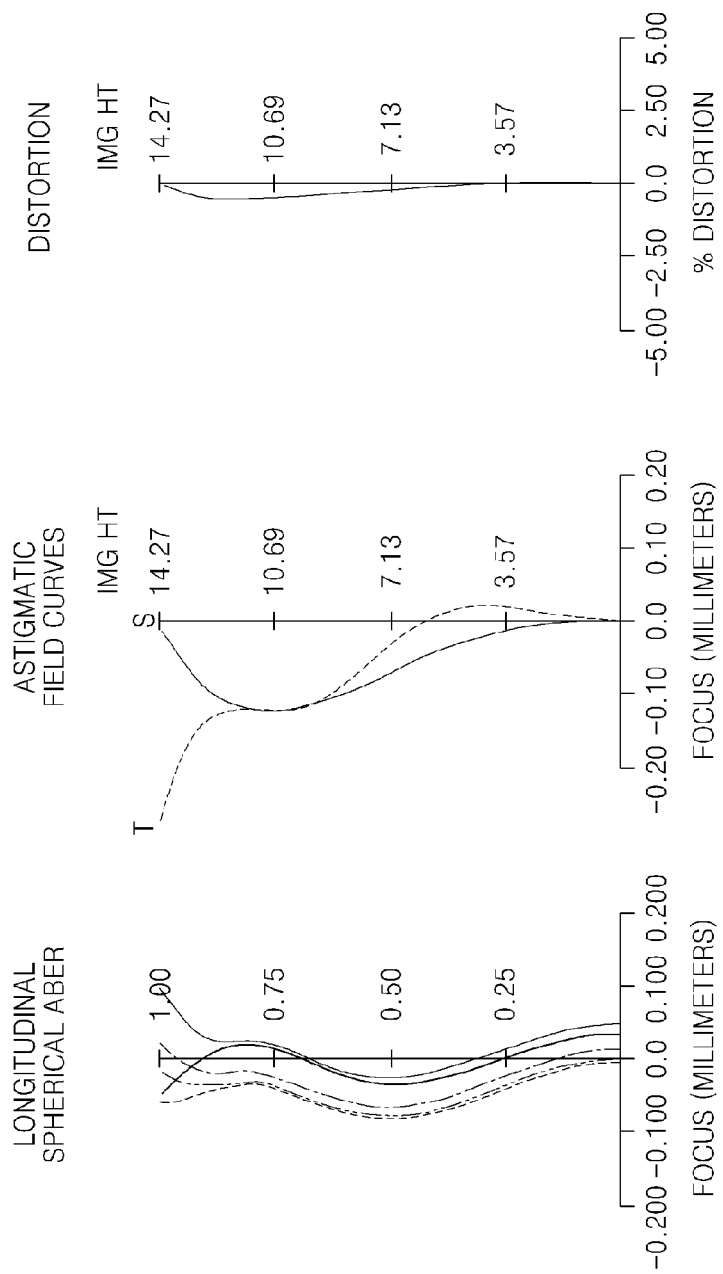
Figure 8C:
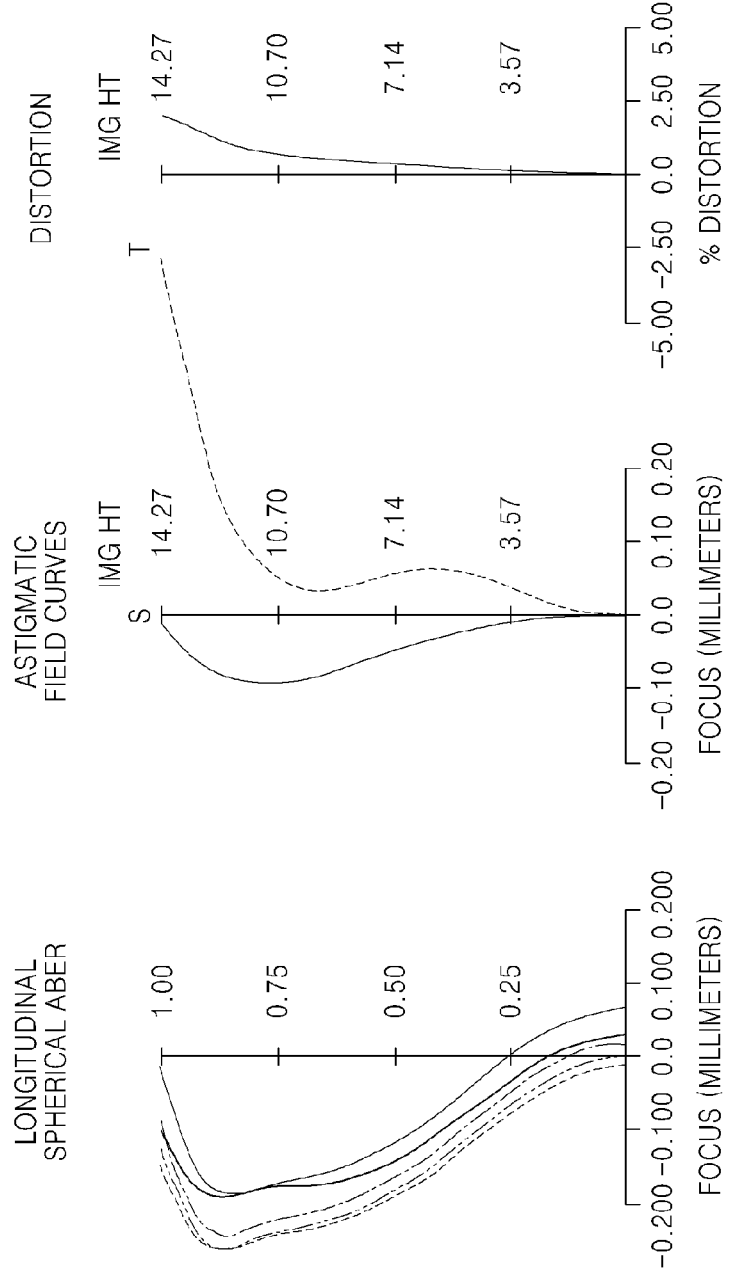

FIGS. 8A through 8C illustrate spherical aberrations, astigmatic field curvatures, and distortion aberrations of the wide-angle lens system 103 of FIG. 7 in the three object positions pos1, pos2, and pos3.

Figure 9A:
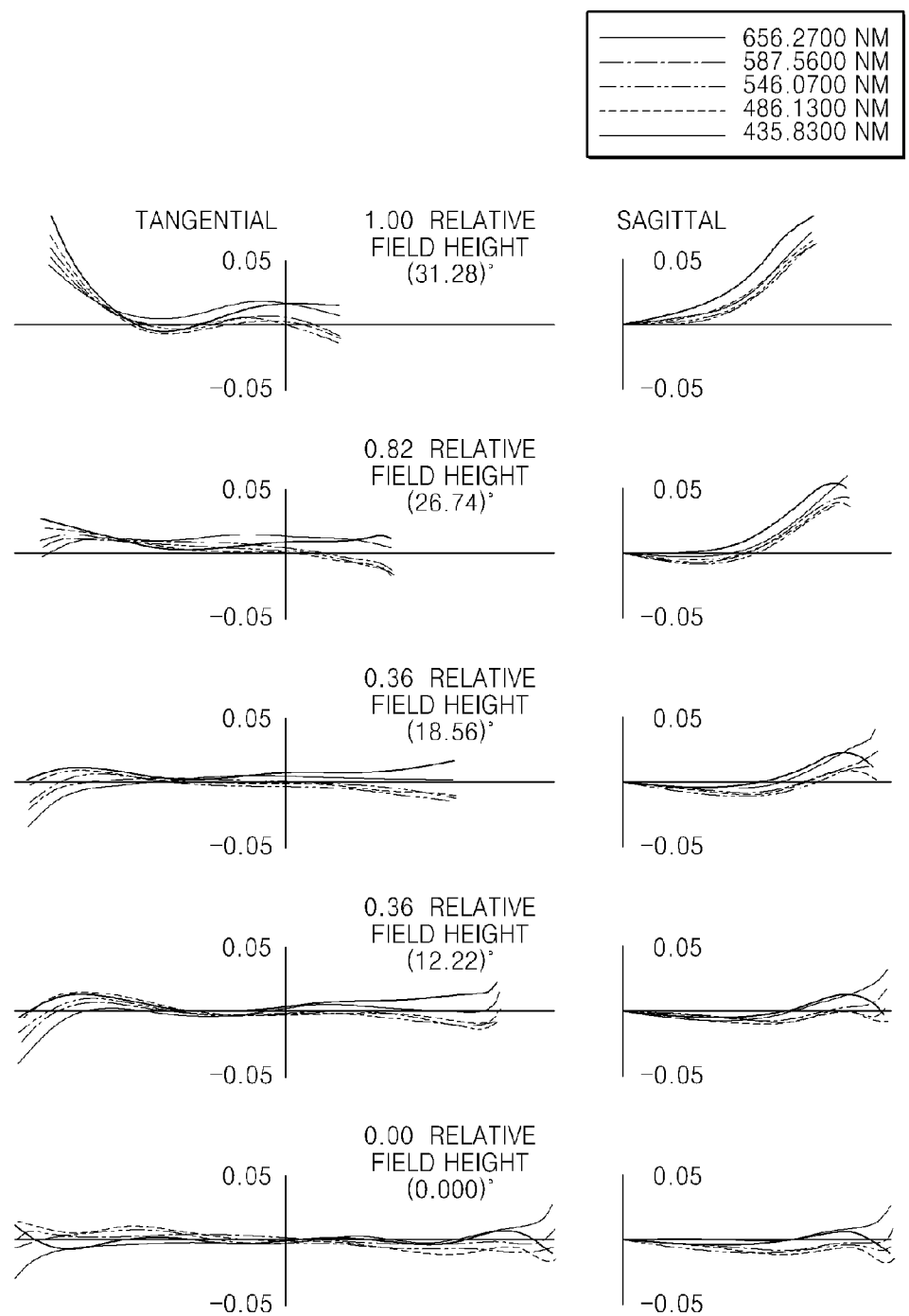
FIGS. 9A through 9C are diagrams illustrating coma aberrations of the wide-angle lens system of FIG. 7 in the three object positions.
Figure 9B:
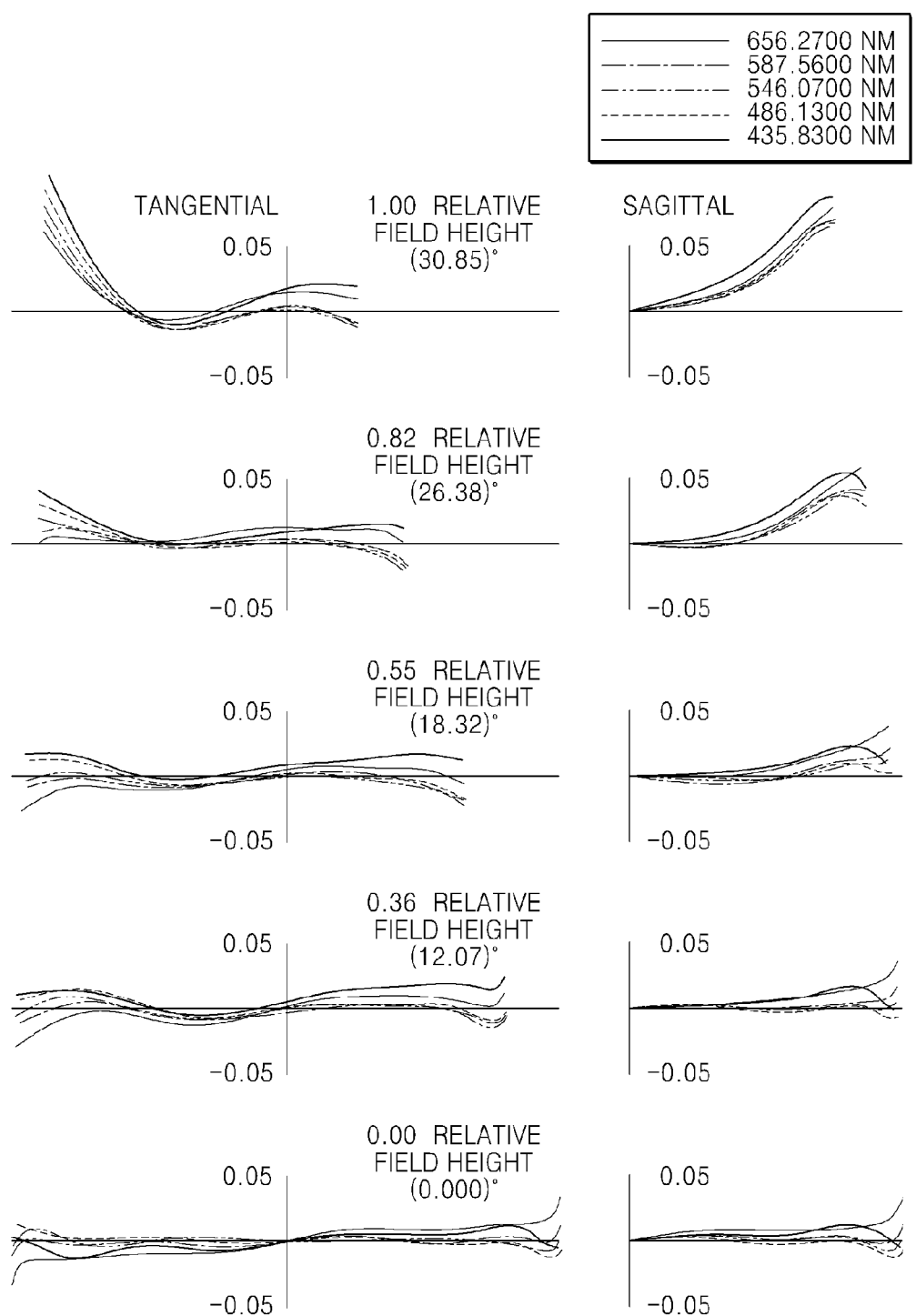
Figure 9C:
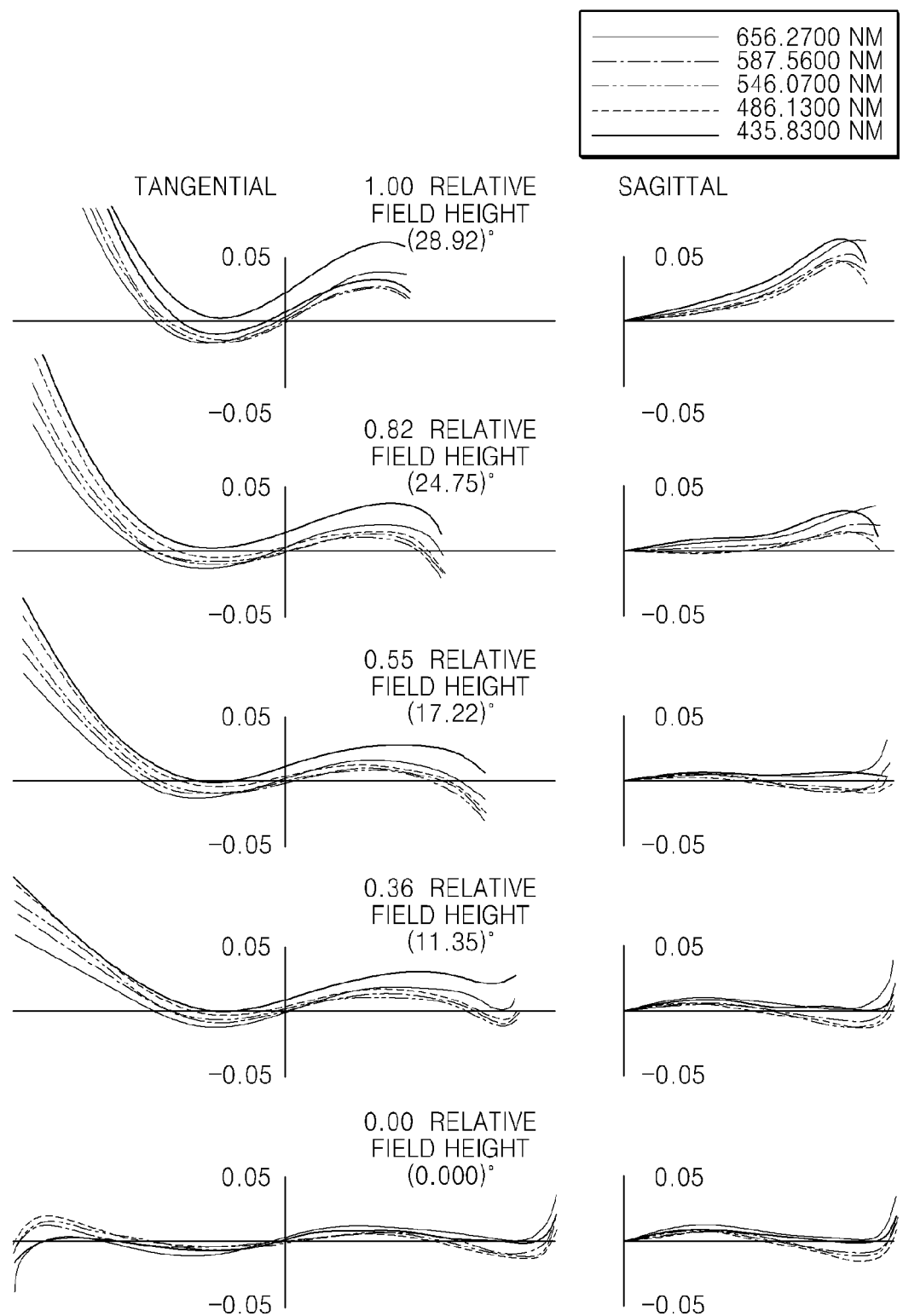

FIGS. 9A through 9C illustrate coma aberrations of the wide-angle lens system 103 of FIG. 7 in the three object positions pos1, pos2, and pos3.

Fourth Embodiment

Figure 10:
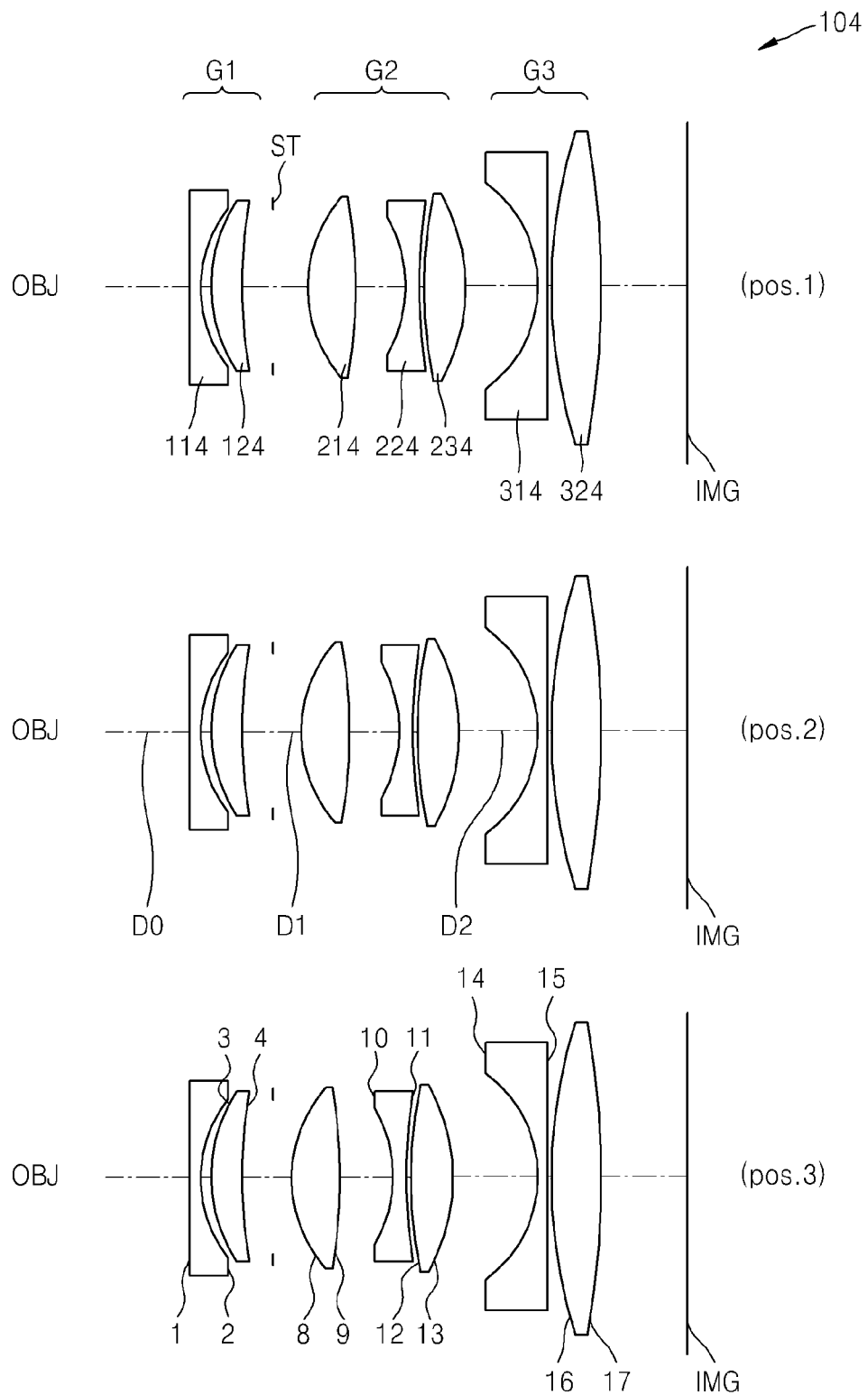
FIG. 10 illustrates optical arrangements in a wide-angle lens system in three object positions, according to another embodiment.

FIG. 10 illustrates optical arrangements in the wide-angle lens system 104 in three object positions pos1, pos2, and pos3, according to another embodiment. The wide-angle lens system 104 includes the first lens group G1 having negative refractive power, the second lens group G2 having positive refractive power, and the third lens group G3 having negative refractive power. The first lens group G1 includes a first lens 114 having a meniscus shape convex towards the object OBJ side, and a second lens 124 having a meniscus shape convex towards the object OBJ side. The second lens group G2 includes a third lens 214 having a biconvex shape, a fourth lens 224 having a biconcave shape, and a fifth lens 234 having a biconvex shape. The third lens group G3 includes a sixth lens 314 having a biconcave shape and a seventh lens 324 having a biconvex shape.

Lens data of the wide-angle lens system 104 is as follows.

TABLE 10

| Surface | R | Th | nd | vd |
|---|---|---|---|---|
| OBJ | infinity | D0 | | |
| 1 | 300 | 1 | 1.5712 | 39.85 |
| 2 | 11.17 | 1.06 | | |
| 3 | 15.46 | 2.48 | 1.91082 | 35.25 |
| 4 | 41.34 | 0.87 | | |
| 5 (dummy surface) | infinity | 0.12 | | |
| 6 (dummy surface) | infinity | 1.73 | | |
| 7 (ST) | infinity | D1 | | |
| 8* | 11.57 | 4.67 | 1.49993 | 75.89 |
| 9* | −31.26 | 4.11 | | |
| 10 | −11.88 | 1 | 1.71 | 27.91 |
| 11 | 39.44 | 0.13 | | |
| 12 | 50.76 | 3.51 | 1.85066 | 40.4 |
| 13* | −13.89 | D2 | | |
| 14 | −10.74 | 1 | 1.56837 | 40.54 |
| 15 | 592.02 | 0.15 | | |
| 16 | 42.31 | 3.94 | 1.91082 | 35.25 |
| 17 | −100.74 | 7.218 | | |

TABLE 11

| | K | A | B | C | D |
|---|---|---|---|---|---|
| 8 | 3.4033.E−01 | −3.2822.E−05 | 3.4148.E−07 | −1.0565.E−08 | 7.9646.E−11 |
| 9 | −1.0000.E+00 | −1.6365.E−05 | 4.7412.E−07 | −1.6193.E−08 | 1.8827.E−10 |
| 13 | −4.7399.E−01 | 4.2321.E−05 | 1.1385.E−06 | −2.0732.E−08 | 3.6466.E−10 |

TABLE 12

| Magnification | Pos1 0 | Pos2 −1/40 | Pos3 −0.12 |
|---|---|---|---|
| D0 | infinity | 982.17 | 213.68 |
| D1 | 2.78 | 2.42 | 1 |
| D2 | 6.59 | 6.99 | 8.53 |
| ω | 30.87 | 30.38 | 28.48 |
| F/# | 2.02 | 2.05 | 2.19 |

Figure 11A:
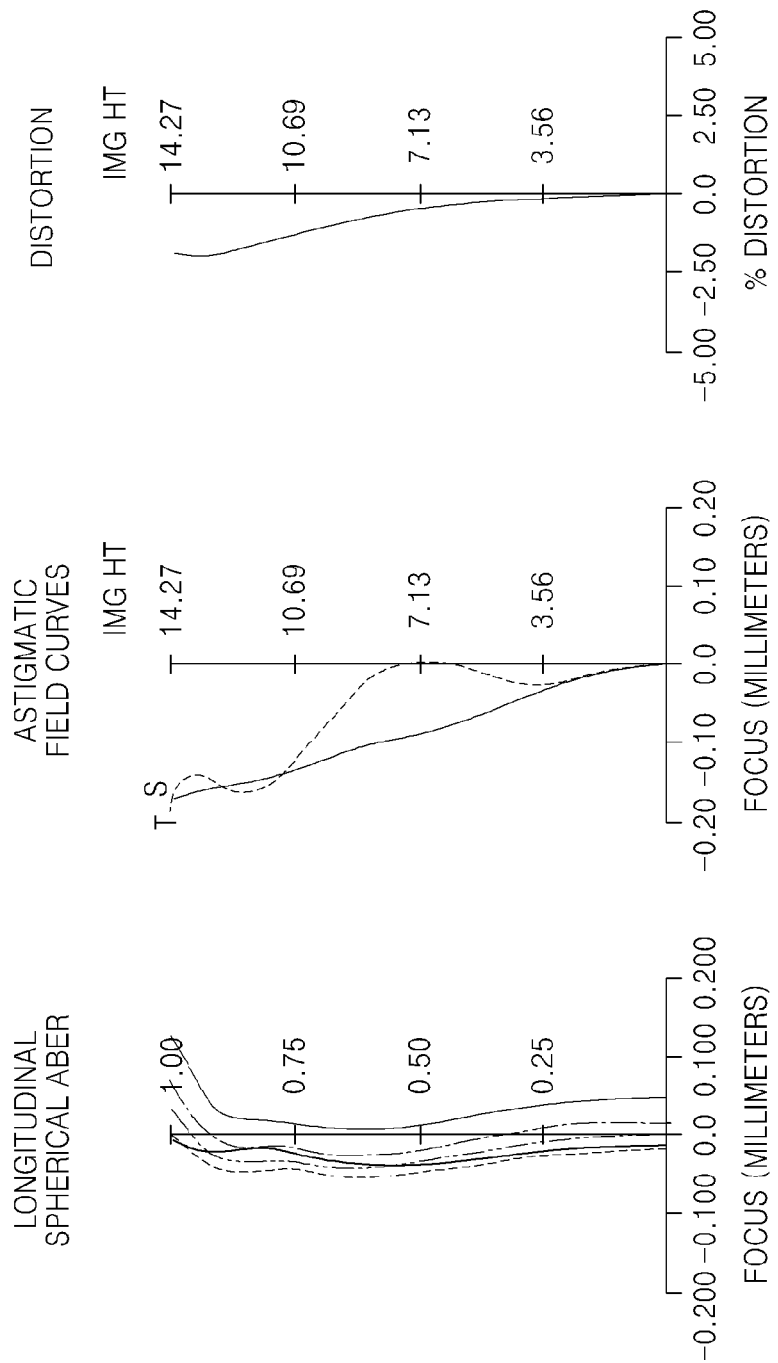
Figure 11C:
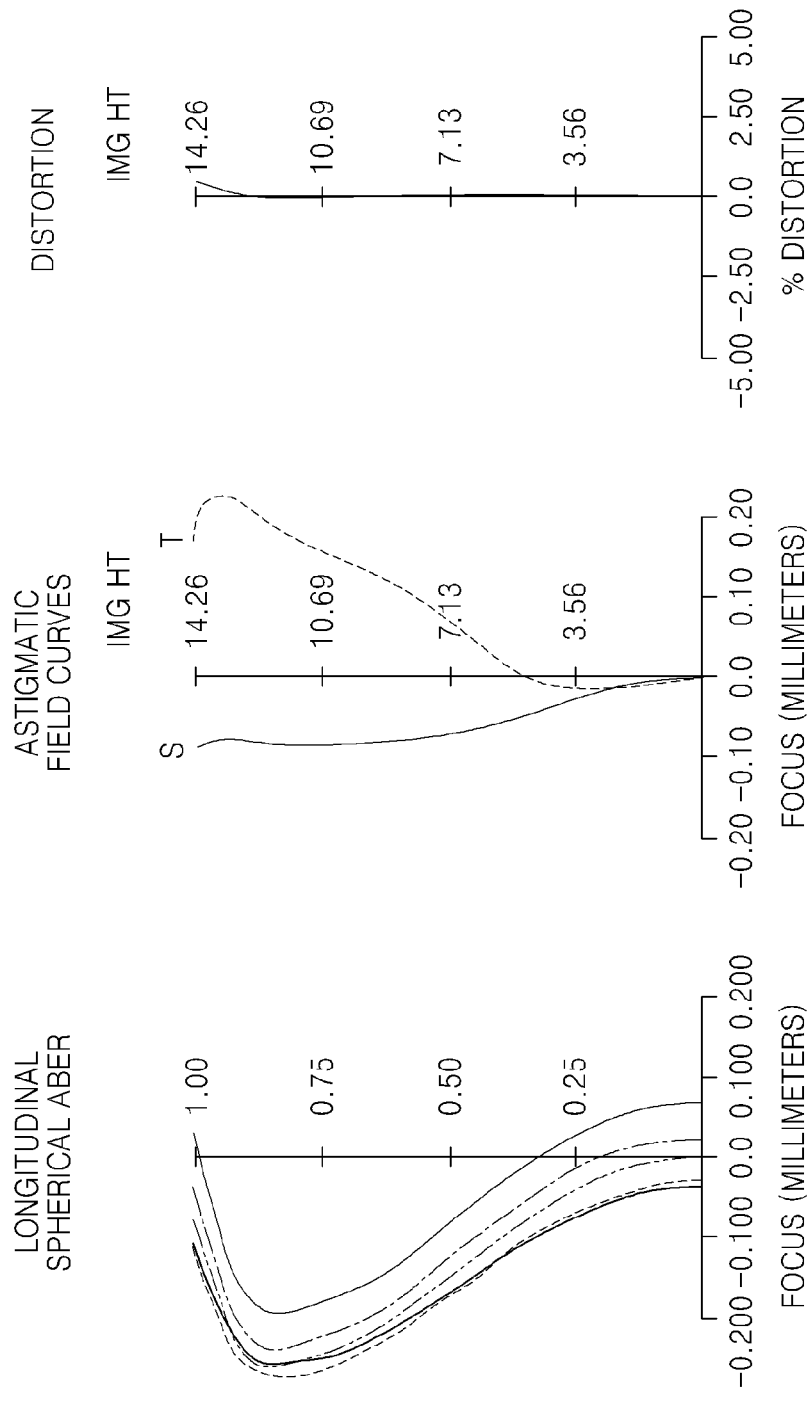

FIGS. 11A through 11C illustrate spherical aberrations, astigmatic field curvatures, and distortion aberrations of the wide-angle lens system 104 of FIG. 10 in the three object positions pos1, pos2, and pos3.

Figure 12A:
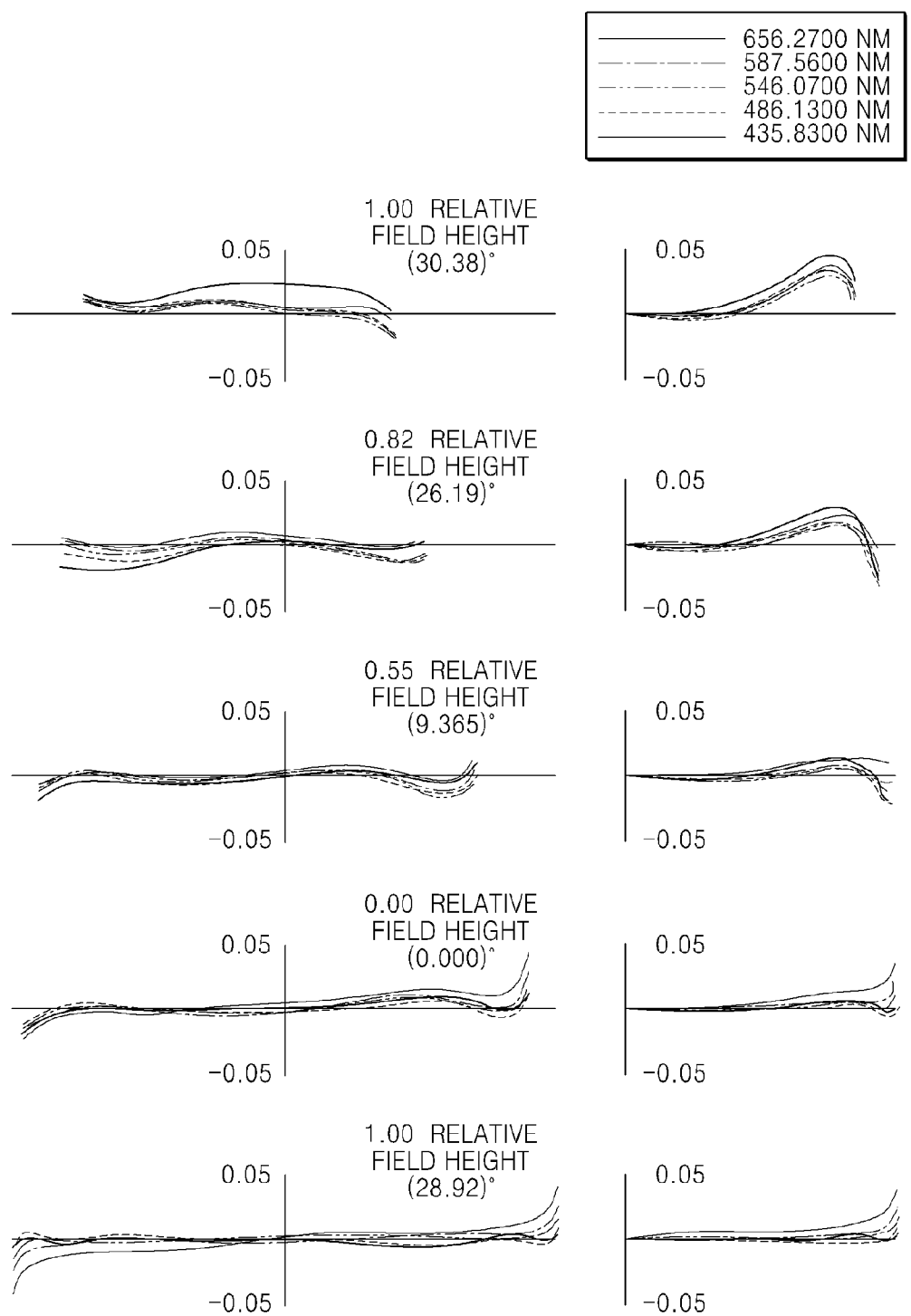
FIGS. 12A through 12C are diagrams illustrating coma aberrations of the wide-angle lens system of FIG. 10 in the three object positions.
Figure 12B:
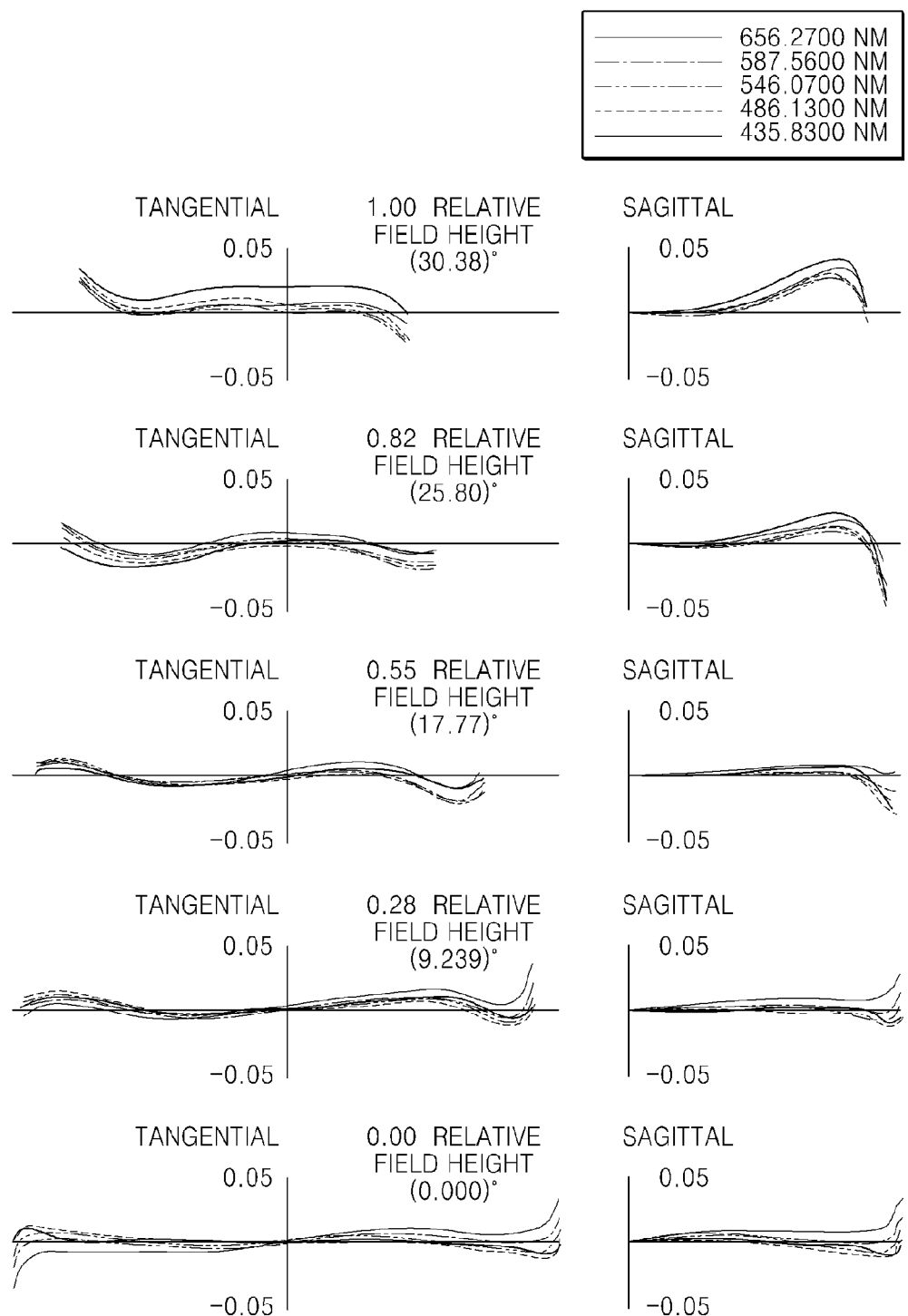
Figure 12C:
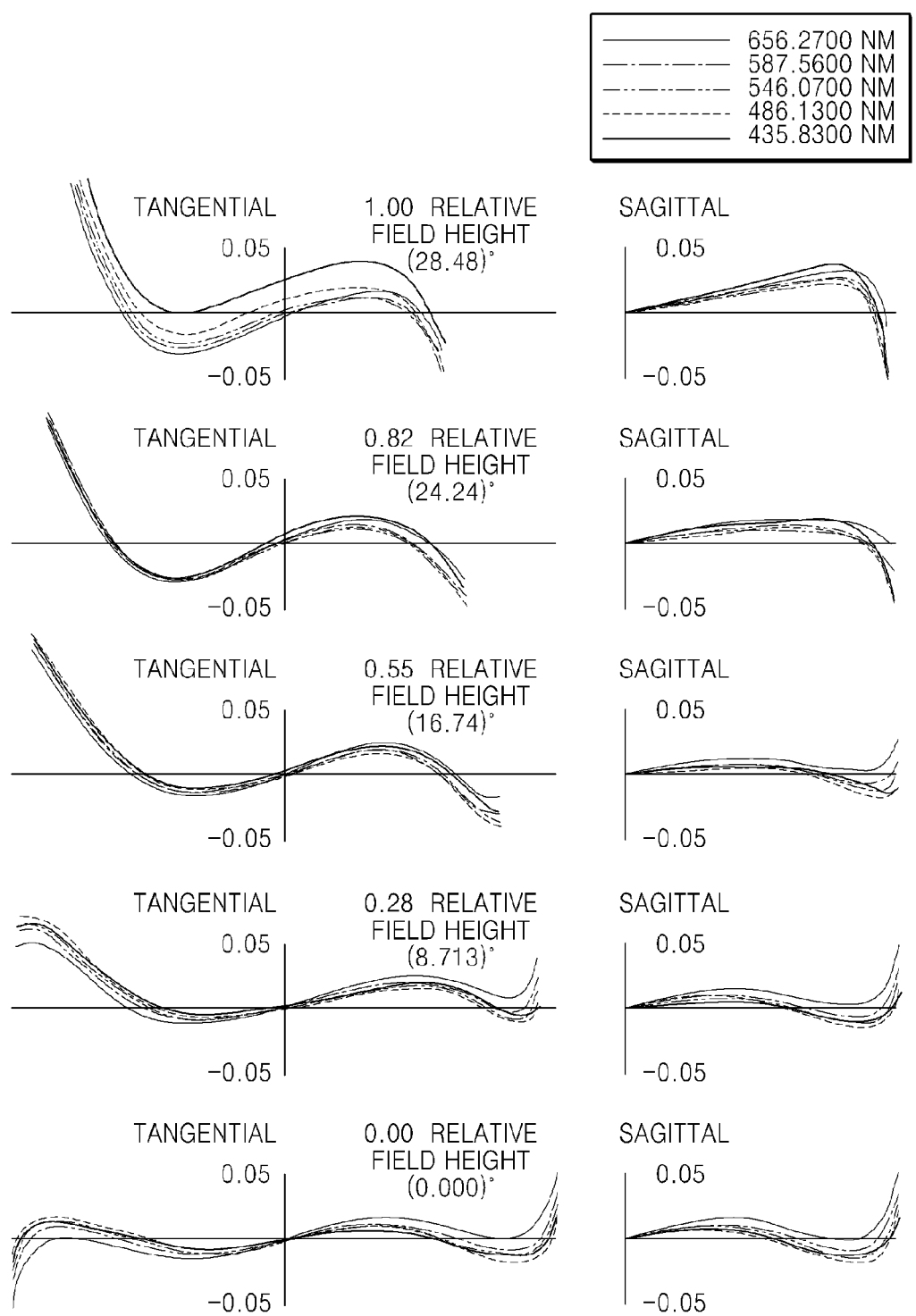

FIGS. 12A through 12C illustrate coma aberrations of the wide-angle lens system 104 of FIG. 10 in the three object positions pos1, pos2, and pos3.

Fifth Embodiment

Figure 13:
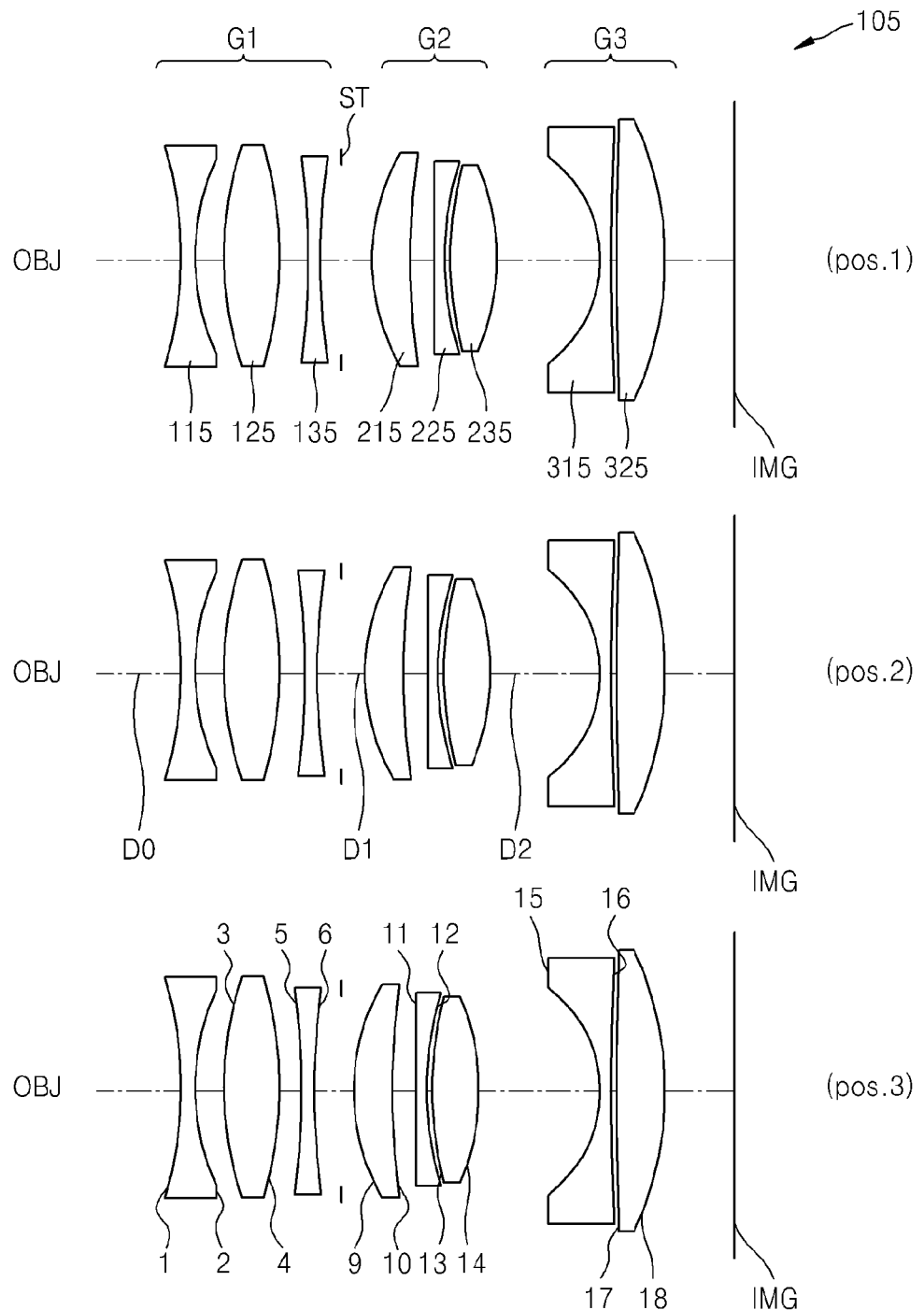
FIG. 13 illustrates optical arrangements in a wide-angle lens system in three object positions, according to another embodiment.

FIG. 13 illustrates optical arrangements in the wide-angle lens system 105 in three object positions pos1, pos2, and pos3, according to another embodiment. The wide-angle lens system 105 includes the first lens group G1 having negative refractive power, the second lens group G2 having positive refractive power, and the third lens group G3 having negative refractive power. The first lens group G1 includes a first lens 115 having a biconcave shape, a second lens 125 having a biconvex shape, and a third lens 135 having a biconcave shape. The second lens group G2 includes a fourth lens 215 having a meniscus shape convex towards the object OBJ side, a fifth lens 225 having a biconcave shape, and a sixth lens 235 having a biconvex shape. The third lens group G3 includes a seventh lens 313 having a concave shape at the object OBJ side, and an eighth lens 323 having a shape convex toward the image surface IMG side.

Lens data of the wide-angle lens system 105 is as follows.

TABLE 13

| Surface | R | Th | nd | vd | Surface |
|---|---|---|---|---|---|
| OBJ | infinity | D0 | | | |
| 1 | −37.89 | 1 | 487489.7 | 1.48749 | 70.44 |
| 2 | 18.04 | 2.49 | | | |
| 3* | 22.97 | 4.5 | 879550.37 | 1.87955 | 37.1 |
| 4 | −35.38 | 2.51 | | | |
| 5 | −86.62 | 1.12 | 945945.18 | 1.94595 | 17.98 |
| 6 | 51.78 | 2.2 | | | |
| 7 | infinity | 0.03 | | | |
| 8 (ST) | infinity | D1 | | | |
| 9* | 16.1 | 3.1 | 850660.4 | 1.85066 | 40.4 |
| 10* | 31.8 | 2.19 | | | |
| 11 | −425 | 0.72 | 922860.21 | 1.92286 | 20.88 |
| 12 | 23.3 | 0.49 | | | |
| 13* | 23.1 | 3.9 | 850660.4 | 1.85066 | 40.4 |
| 14* | −25.3 | D2 | | | |
| 15 | −10.5 | 0.85 | 487489.7 | 1.48749 | 70.44 |
| 16 | 158.8 | 0.41 | | | |
| 17 | −20604.7 | 3.8 | 910822.35 | 1.91082 | 35.25 |
| 18 | −29.2 | 5.514 | | | |

TABLE 14

| | K | A | B | C | D |
|---|---|---|---|---|---|
| 3 | 1.2636.E+00 | −3.18E−05 | −1.05E−07 | 4.24E−11 | 0.00E+00 |
| 9 | 4.2656.E−01 | −7.85E−05 | 4.80E−07 | −8.49E−09 | 0.00E+00 |
| 10 | −8.0202.E+00 | −1.04E−04 | 1.39E−06 | −2.31E−08 | 1.10E−10 |
| 13 | −4.4725.E+00 | −6.08E−05 | 8.25E−07 | −1.37E−08 | 2.20E−11 |
| 14 | −8.5300.E−02 | −1.14E−05 | 1.79E−07 | −2.56E−09 | −5.37E−11 |

TABLE 15

| | Pos1 | Pos2 | Pos3 |
|---|---|---|---|
| Magnification | 0 | −1/40 | −0.12 |
| D0 | infinity | 943.45 | 201.59 |
| D1 | 2.23 | 1.93 | 0.78 |
| D2 | 8.94 | 9.24 | 10.39 |
| ω | 32.46 | 32.09 | 30.61 |
| F/# | 1.48 | 1.49 | 1.59 |

Figure 14A:
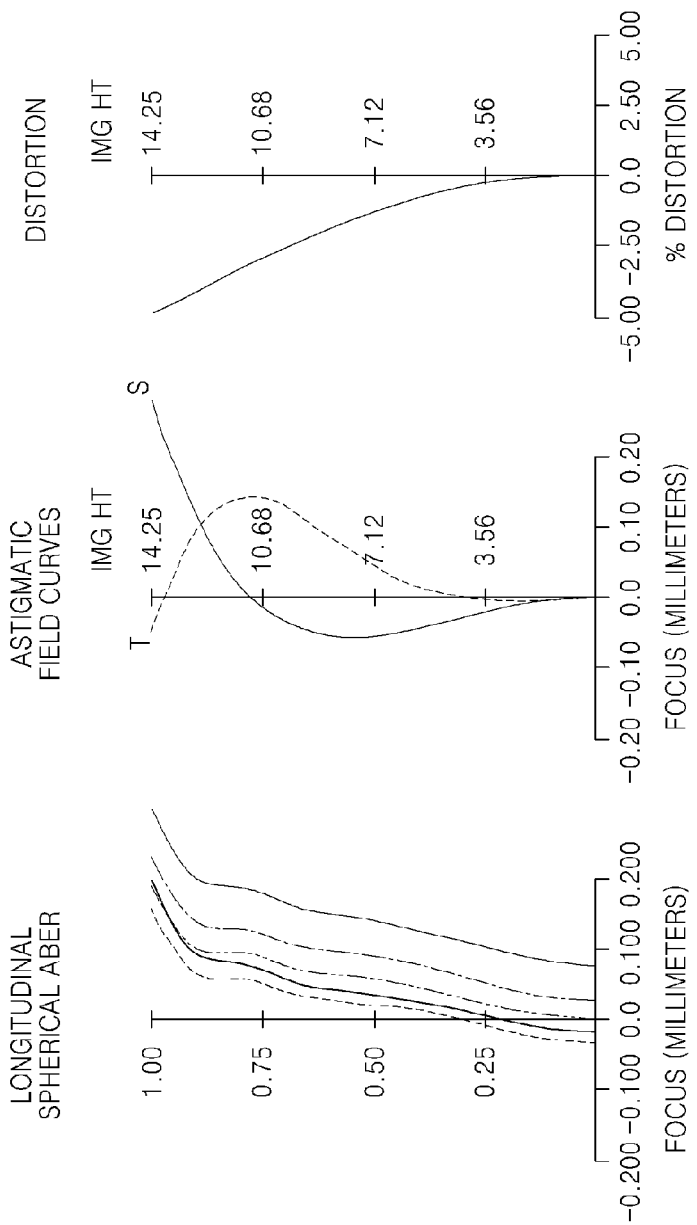
FIGS. 14A through 14C are diagrams illustrating spherical aberrations, astigmatic field curvatures, and distortion aberrations of the wide-angle lens system of FIG. 13 in the three object positions.
Figure 14B:
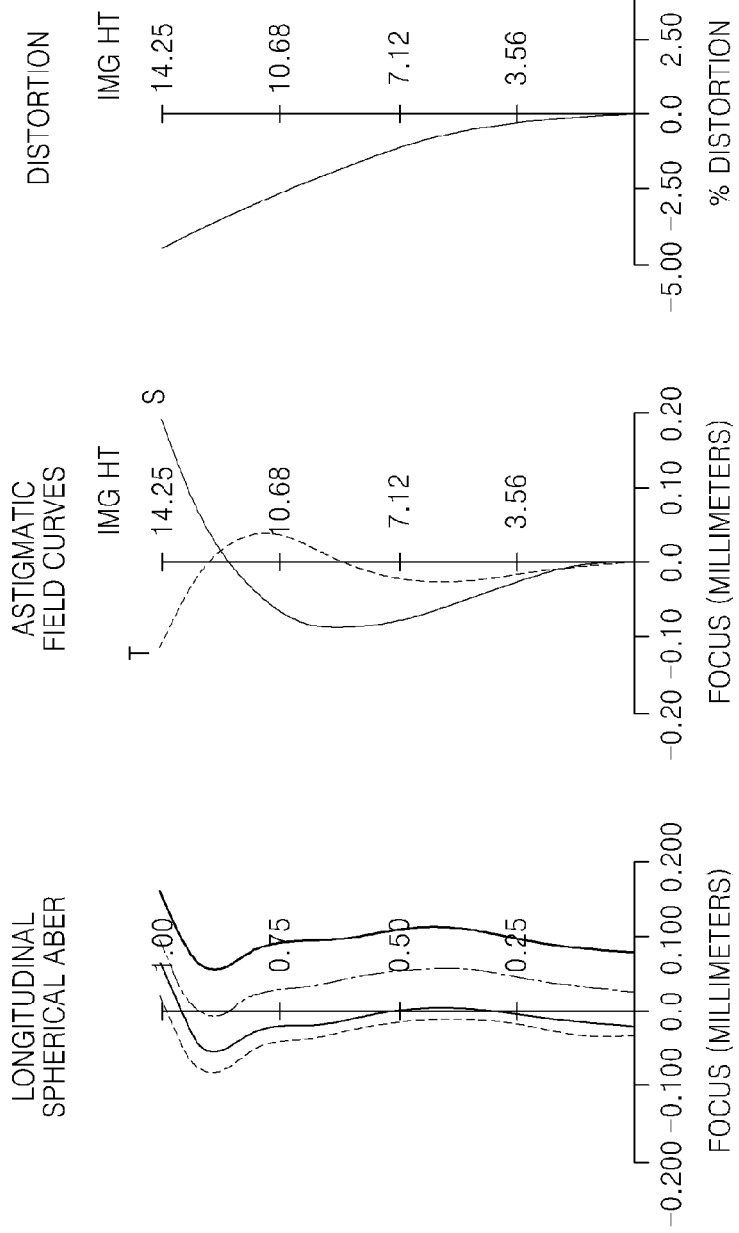
Figure 14C:
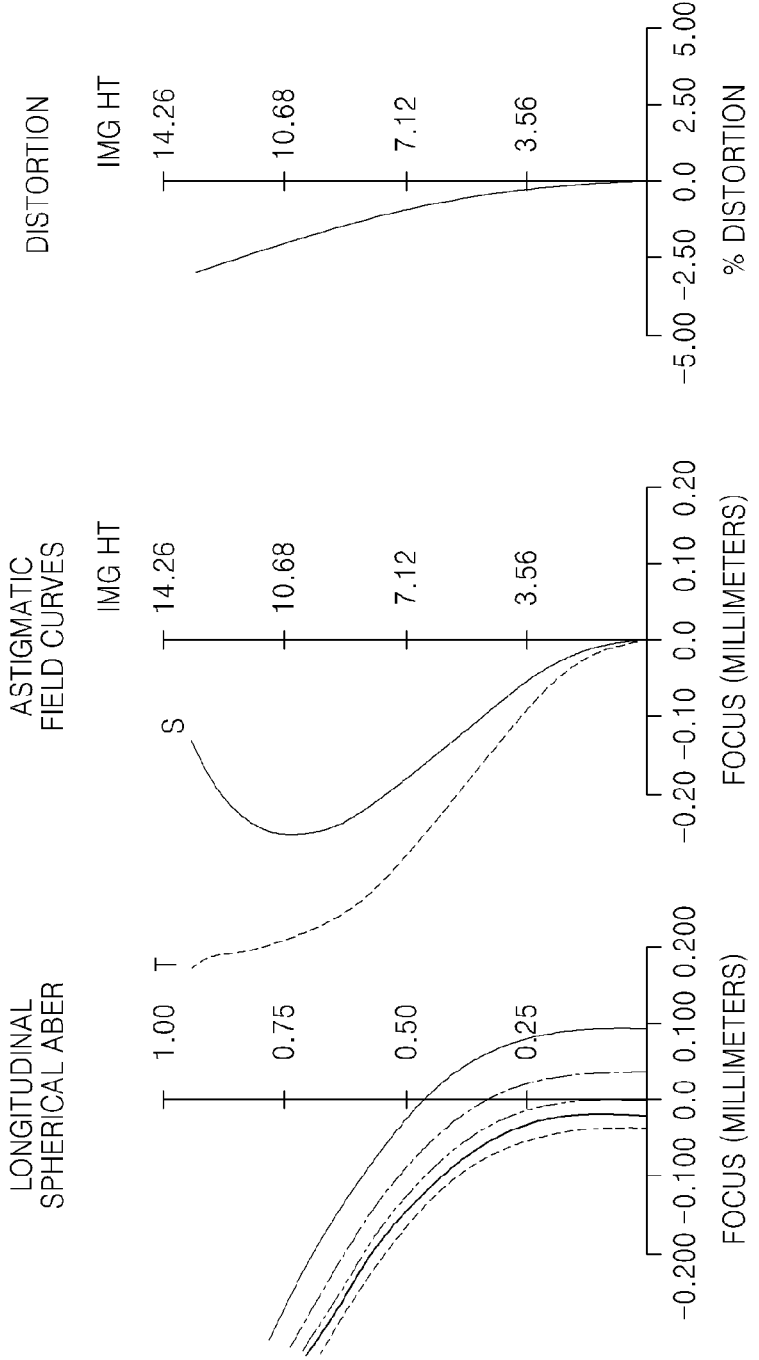

FIGS. 14A through 14C illustrate spherical aberrations, astigmatic field curvatures, and distortion aberrations of the wide-angle lens system 105 of FIG. 13 in the three object positions pos1, pos2, and pos3.

Figure 15A:
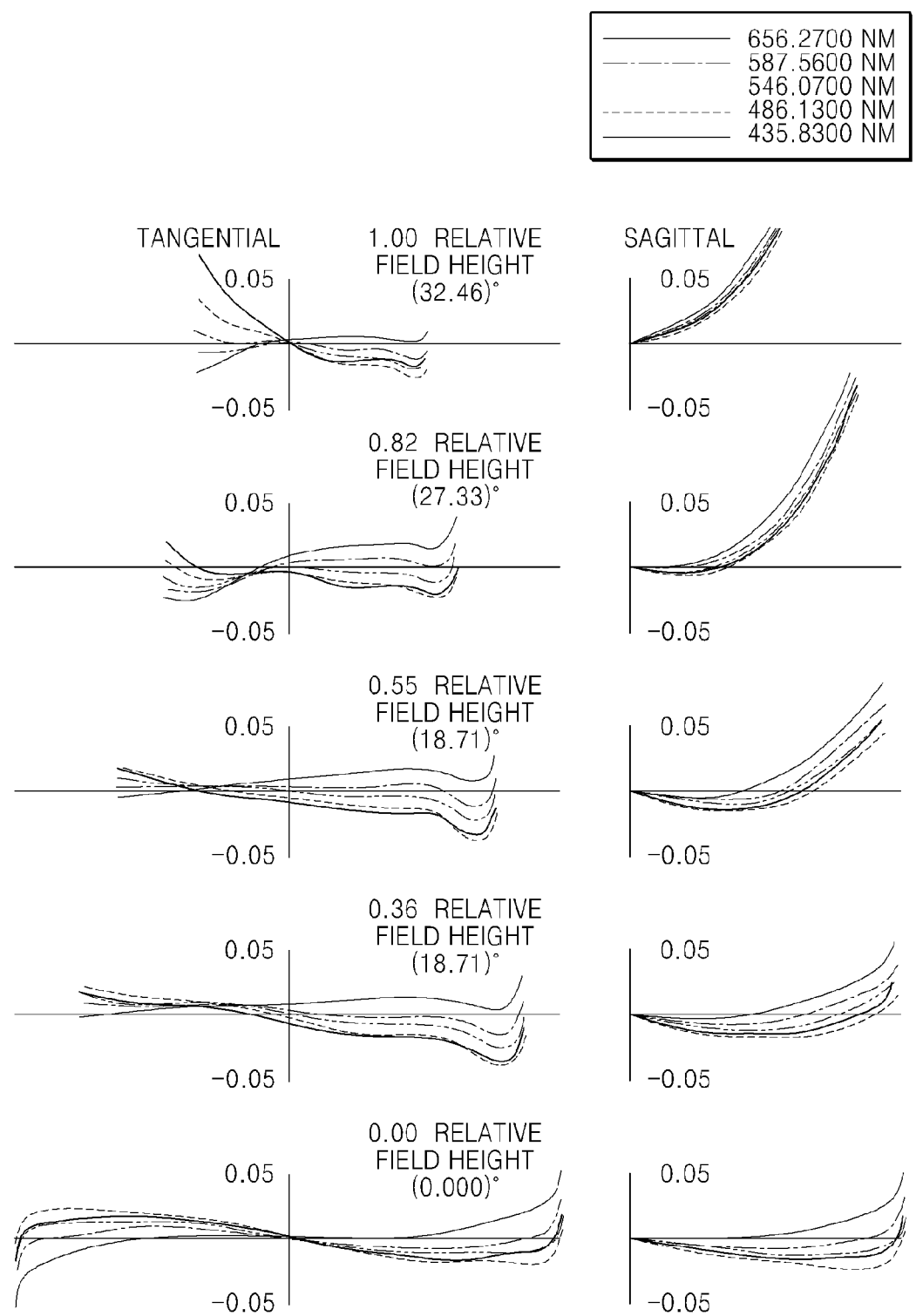
FIGS. 15A through 15C are diagrams illustrating coma aberrations of the wide-angle lens system of FIG. 13 in the three object positions.
Figure 15B:
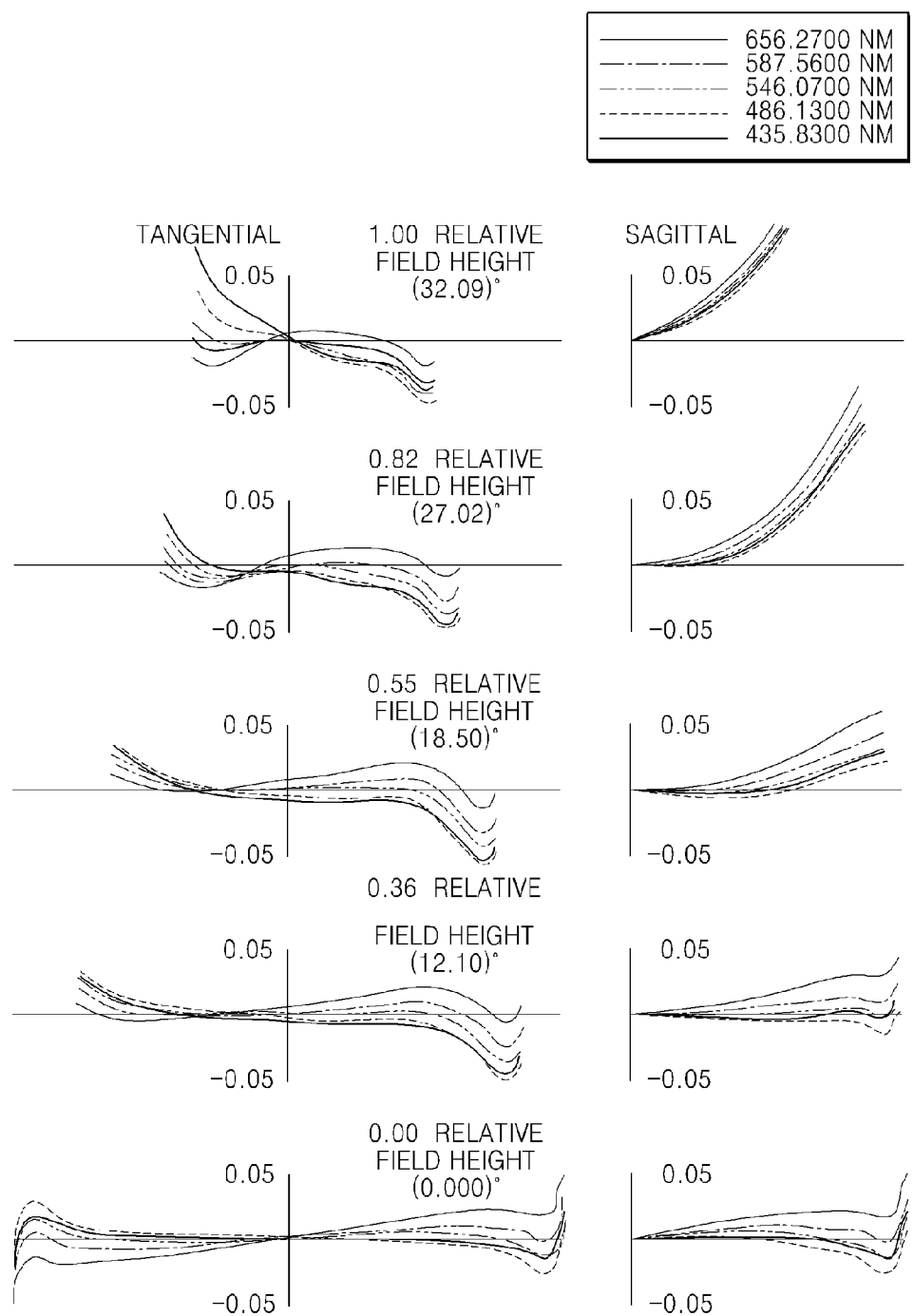
Figure 15C:
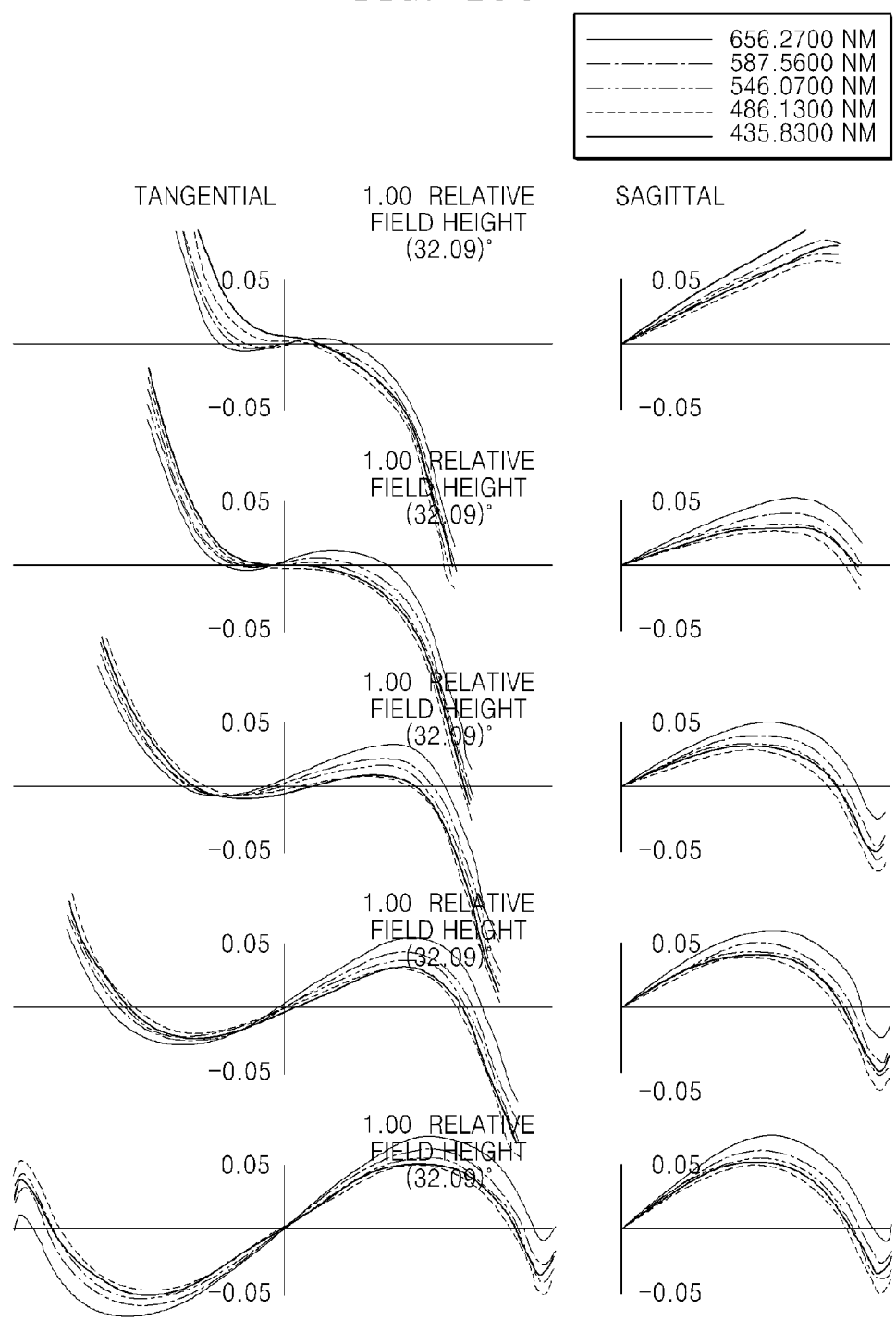

FIGS. 15A through 15C illustrate coma aberrations of the wide-angle lens system 105 of FIG. 13 in the three object positions pos1, pos2, and pos3.

Table 16 below shows that the wide-angle lens systems 101 through 105 satisfy the above conditions.

TABLE 16

| | Embodiment | | | | |
|---|---|---|---|---|---|
| Condition | First Embodiment | Second Embodiment | Third Embodiment | Fourth Embodiment | Fifth Embodiment |
| OAL | 42.93 | 42.91 | 43.93 | 42.32 | 45.95 |
| Y | 14.26 | 14.47 | 14.24 | 14.53 | 14.96 |
| f2 | 21.43 | 19.43 | 17.11 | 18.40 | 19.51 |
| f | 24.72 | 23.46 | 23.46 | 24.33 | 23.46 |
| OL2 | 10.72 | 11.93 | 11.41 | 13.42 | 10.40 |
| OL3 | 6.89 | 4.18 | 4.57 | 5.09 | 5.05 |
| OL23 | 22.88 | 24.12 | 23.43 | 25.10 | 24.39 |
| Fno | 1.84 | 1.86 | 1.84 | 2.02 | 1.48 |
| BF | 7.32 | 6.59 | 6.20 | 7.22 | 5.48 |
| OAL/Y | 3.01 | 2.97 | 3.08 | 2.91 | 3.07 |
| f2/f | 0.87 | 0.83 | 0.73 | 0.76 | 0.83 |
| (OL2 + OL3)/OL23 | 0.77 | 0.67 | 0.68 | 0.74 | 0.63 |
| Fno*(OAL/Y) | 5.53 | 5.52 | 5.67 | 5.88 | 4.57 |
| BF/Y | 0.51 | 0.46 | 0.44 | 0.5 | 0.37 |

According to the embodiments described above, a wide-angle lens system suitable for an electronic still camera or a video camera is disclosed. The wide-angle lens system, in particular, uses an inner focus method whose auto-focusing is stable, and at the same time, has a bright lens whose F-number is about 1.4 to about 2.1 and a viewing angle that is equal to or higher than 60°.

The wide-angle lens system achieves high focusing responsiveness by simplifying a focusing structure.

The wide-angle lens system includes a bright wide-angle lens having a compact structure, and exhibits excellent optical performance.

The wide-angle lens system according to one or more embodiments may be employed in any one of various types of imaging apparatuses, along with an image pickup device that converts an optical image formed by the wide-angle lens system into an electric signal.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A wide-angle lens system comprising, in an order from an object side toward an image surface side:

a first lens group having refractive power;

a second lens group having positive refractive power; and a third lens group having negative refractive power, wherein, when an object position changes from an infinite distance to a nearest distance, the first and third lens groups are fixed, and only the second lens group moves along an optical axis to perform focusing, and wherein the second lens group consists of a lens having positive refractive power, a lens having negative refractive power, and a lens having positive refractive power, in an order from the object side toward the image surface side, wherein the wide-angle lens system satisfies the following condition:

$$1.48 \leq Fno \leq 2.02,$$

$$3.5 \leq Fno*OAL/Y < 6.5,$$

wherein Fno denotes a F-number during a full-opening, OAL denotes a distance between a first surface of the wide-angle lens system closest to the object side and an image surface, and Y denotes a paraxial image height.

2. The wide-angle lens system of claim 1, further satisfying the following condition:

$$0.6 < f2/f < 1.5,$$

wherein $f2$ and $f$ respectively denotes a focal length of the second lens group and a total focal length of the wide-angle lens system based on an infinite object position.

3. The wide-angle lens system of claim 1, wherein the first lens group or the second lens group comprises an aspherical lens having at least one aspherical surface.

4. The wide-angle lens system of claim 1, wherein the lens system performs hand shake compensation by moving a part of the first lens group or the entire first lens group in a direction crossing the optical axis.

5. The wide-angle lens system of claim 1, wherein an aperture stop is disposed between the first and second lens groups, wherein the aperture stop is fixed during focusing.

6. The wide-angle lens system of claim 1, further satisfying following condition:

$$0.35 < (OL2+OL3)/OL23 < 0.8,$$

wherein OL23 denotes a distance between a first surface of the second lens group from the object side and a surface of the third lens group closest to the image surface side, OL2 denotes a distance between the first surface of the second lens group from the object side and a last surface of the second lens group from the object side, and OL3 denotes a distance between a first surface of the third lens group from the object side and a last surface of the third lens group from the object side.

7. The wide-angle lens system of claim 1, further satisfying the following condition:

$$0.15 < BF/Y < 1.0,$$

wherein BF denotes a distance between a surface of the wide-angle lens system closest to the image surface side and an image surface, and Y denotes a paraxial image height.

8. The wide-angle lens system of claim 1, wherein a total length of the wide-angle lens system is reduced as the first, second, and third lens groups move to the image surface side when the wide-angle lens system is not in use.

9. An imaging apparatus comprising:
the wide-angle lens system of claim 1; and
an image pickup device that converts an optical image formed by the wide-angle lens system to an electric signal.

10. The wide-angle lens system of claim 1, wherein the first lens group has a positive refractive power.

11. The wide-angle lens system of claim 10, further satisfying the following condition:

$$0.15 < BF/Y < 1.0,$$

wherein BF denotes a distance between a surface of the wide-angle lens system closest to the image surface side and the image surface, and Y denotes a paraxial image height.

12. The wide-angle lens system of claim 10, further satisfying the following condition:

$$0.6 < f2/f < 1.5,$$

wherein f2 and f respectively denote a focal length of the second lens group and a total focal length of the wide-angle lens system based on an infinite object position.

13. The wide-angle lens system of claim 10, wherein the first lens group or the second lens group comprises an aspherical lens having at least one aspherical surface.

14. The wide-angle lens system of claim 10, wherein the lens system performs hand shake compensation by moving a part of the first lens group or the entire first lens group in a direction crossing an optical axis.

15. The wide-angle lens system of claim 10, wherein an aperture stop is disposed between the first and second lens groups, wherein the aperture stop is fixed during focusing.

16. The wide-angle lens system of claim 10, further satisfying the following condition:

$$0.35 < (OL2 + OL3)/OL23 < 0.8,$$

wherein OL23 denotes a distance between a first surface of the second lens group from the object side and a surface of the third lens group closest to the image surface side, OL2 denotes a distance between the first surface of the second lens group from the object side and a last surface of the second lens group from the object side, and OL3 denotes a distance between a first surface of the third lens group from the object side and a last surface of the third lens group from the object side.

17. The wide-angle lens system of claim 10, wherein a total length of the wide-angle lens system is reduced as the first, second, and third lens groups move to the image surface side when the wide-angle lens system is not in use.

* * * * *